(12) United States Patent
Yasuda et al.

(10) Patent No.: US 11,402,646 B2
(45) Date of Patent: Aug. 2, 2022

(54) DISPLAY APPARATUS, DISPLAY CONTROL METHOD, AND PROGRAM

(71) Applicant: Sony Group Corporation, Tokyo (JP)

(72) Inventors: Ryouhei Yasuda, Tokyo (JP); Shinichi Kawano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/283,557

(22) PCT Filed: Sep. 19, 2019

(86) PCT No.: PCT/JP2019/036738
§ 371 (c)(1),
(2) Date: Apr. 8, 2021

(87) PCT Pub. No.: WO2020/100422
PCT Pub. Date: May 22, 2020

(65) Prior Publication Data
US 2021/0389595 A1     Dec. 16, 2021

(30) Foreign Application Priority Data
Nov. 12, 2018 (JP) .............................. JP2018-211959

(51) Int. Cl.
*G02B 27/01* (2006.01)
*G02B 27/00* (2006.01)
(Continued)

(52) U.S. Cl.
CPC .......... *G02B 27/0179* (2013.01); *B60K 35/00* (2013.01); *G02B 27/0093* (2013.01);
(Continued)

(58) Field of Classification Search
CPC .............. G02B 27/179; G02B 27/0093; G02B 2027/0187; G02B 27/0179; B60K 35/00;
(Continued)

(56) References Cited

U.S. PATENT DOCUMENTS

2009/0125849 A1* 5/2009 Bouvin ................... G06F 3/013
715/863
2013/0326364 A1 12/2013 Latta et al.
(Continued)

FOREIGN PATENT DOCUMENTS

JP    2007-296889 A    11/2007
JP    2009-514090 A     4/2009
(Continued)

OTHER PUBLICATIONS

International Search Report and Written Opinion dated Dec. 3, 2019, received for PCT Application PCT/JP2019/036738, Filed on Sep. 19, 2019, 9 pages including English Translation.

*Primary Examiner* — Brent D Castiaux
(74) *Attorney, Agent, or Firm* — Xsensus LLP

(57) ABSTRACT

A control unit controls a movement of a viewpoint-following display area that moves in accordance with the movement of a user's point of regard, and determines whether to cause the viewpoint-following display area to follow the user's point of regard or to stop the viewpoint-following display area from following the user's point of regard, according to the staying time of the user's point of regard. The display apparatus is configured as a three-dimensional display apparatus or a HUD that allows the viewpoint-following display area to be observed in front of a fixed display area. In a case where the staying time of the user's point of regard reaches or exceeds a specified time t set in advance, the control unit does not cause the viewpoint- (Continued)

following display area to follow the user's point of regard, but fixes the viewpoint-following display area for display.

12 Claims, 17 Drawing Sheets

(51) Int. Cl.
*G06F 3/01* (2006.01)
*B60K 35/00* (2006.01)

(52) U.S. Cl.
CPC ........ *G06F 3/013* (2013.01); *B60K 2370/149* (2019.05); *B60K 2370/1529* (2019.05); *G02B 2027/0187* (2013.01)

(58) Field of Classification Search
CPC ...... B60K 2370/149; B60K 2370/1529; G06F 3/013; G06F 3/0481; G06F 3/04842; G06F 3/4895; G09G 3/2092; G09G 2320/0261; G09G 2354/00; G09G 5/00
See application file for complete search history.

(56) References Cited

U.S. PATENT DOCUMENTS

| | | | |
|---|---|---|---|
| 2016/0004306 A1* | 1/2016 | Maltz | G06F 3/04817 345/173 |
| 2018/0065482 A1* | 3/2018 | Yagyu | B60R 1/00 |
| 2018/0239426 A1* | 8/2018 | Yoshifuji | G06F 3/013 |
| 2019/0244416 A1* | 8/2019 | Tamaoki | A63F 13/428 |

FOREIGN PATENT DOCUMENTS

| | | | |
|---|---|---|---|
| JP | 6081839 B2 | | 2/2017 |
| JP | 2018-45459 A | | 3/2018 |
| JP | 2018045459 A | * | 3/2018 |
| JP | 2018045459 A | * | 3/2018 |
| WO | 2017/069176 A1 | | 4/2017 |
| WO | 2017/208470 A1 | | 12/2017 |

* cited by examiner

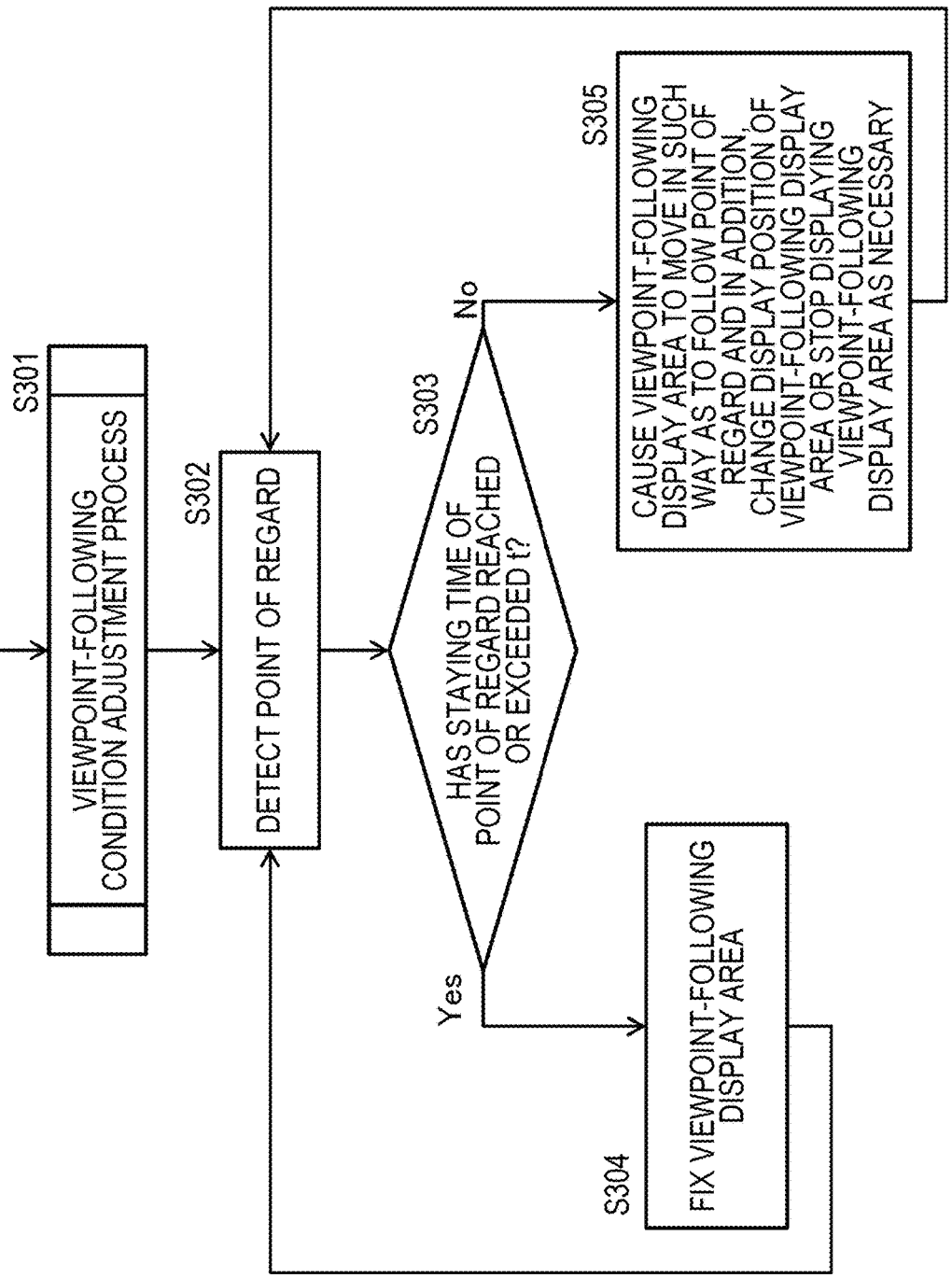

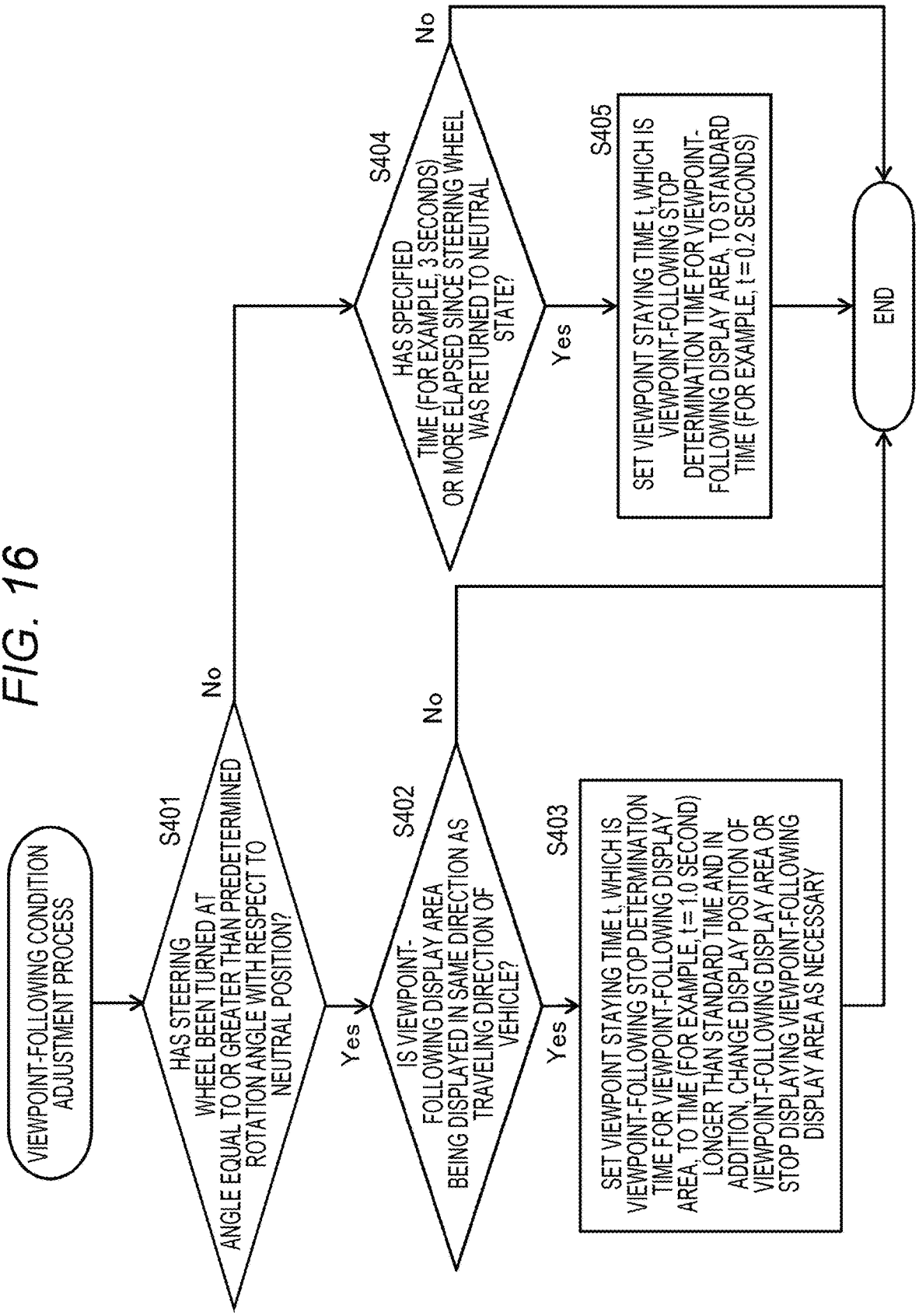

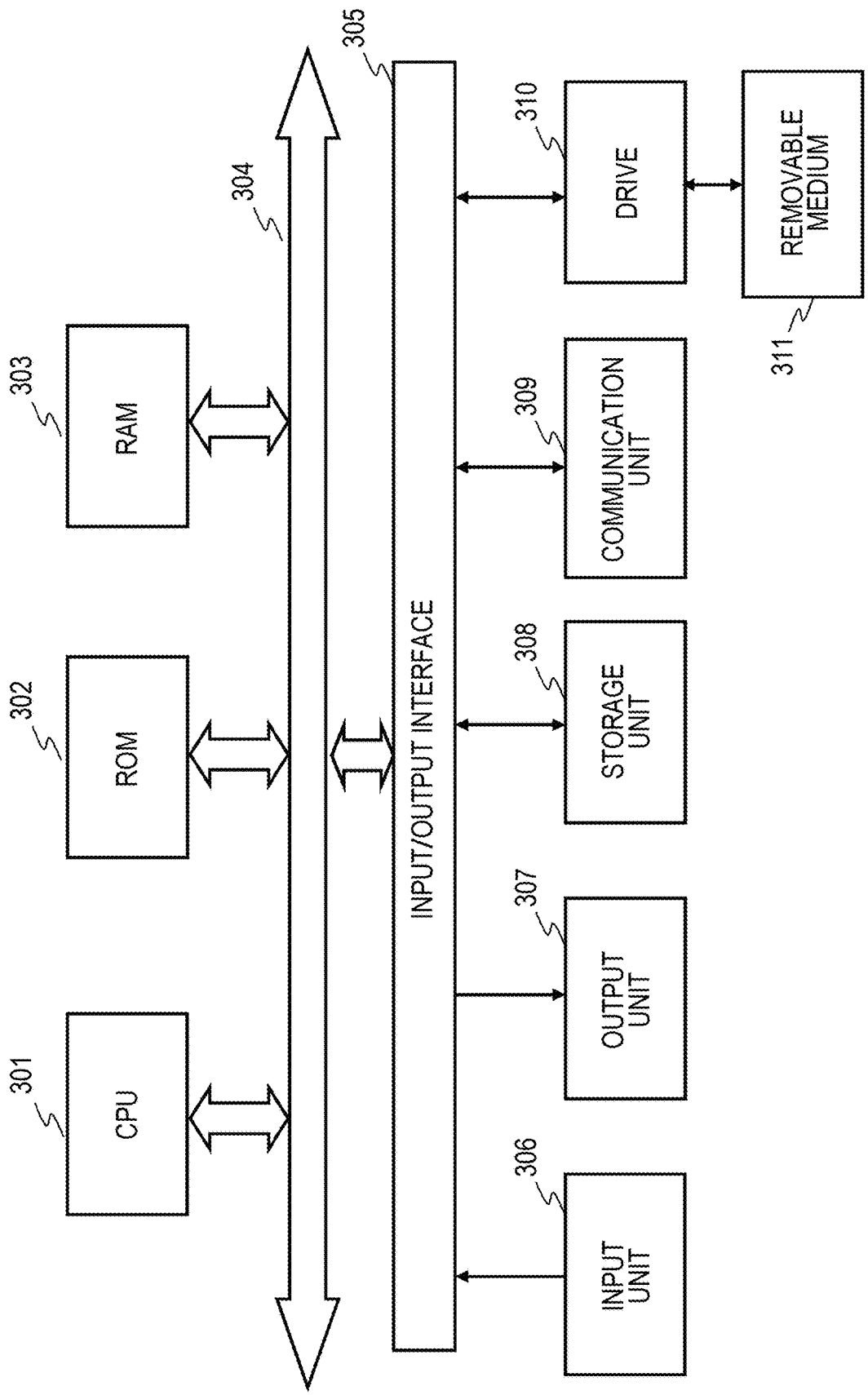

DISPLAY APPARATUS, DISPLAY CONTROL METHOD, AND PROGRAM

CROSS-REFERENCE TO RELATED APPLICATIONS

The present application is based on PCT filing PCT/JP2019/036738, filed Sep. 19, 2019, which claims priority to JP 2018-211959, filed Nov. 12, 2018, the entire contents of each are incorporated herein by reference.

TECHNICAL FIELD

The present disclosure relates to a display apparatus, a display control method, and a program. More specifically, the present disclosure relates to a display apparatus, a display control method, and a program that implement display control of a viewpoint-following display area.

BACKGROUND ART

Recently, use of a three-dimensional display apparatus (3D display apparatus) is increasing. The three-dimensional display apparatus displays an image with a sense of depth by causing right and left eyes to observe different images, that is, so-called parallax images according to a distance.

Furthermore, there has also been proposed a configuration that enables a process based on a user's line of sight in which a user's point of regard is detected and processing is performed according to the detected point of regard. For example, in a case where the user gazes at an operation button displayed on a screen, processing is performed which is to be performed when the button is pressed.

For example, Patent Document 1 (Japanese Patent No. 6081839) discloses the following configuration. A plurality of image surfaces having different depths is displayed on a three-dimensional display apparatus, and an operation button is displayed on a front image surface. In a case where it is detected that a user has gazed at the operation button, it is determined that the operation button has been pressed.

Moreover, a configuration has also been proposed in which control is performed so that a single display area is moved and displayed in such a way as to follow movement of the user's viewpoint.

For example, an image is displayed on a first image surface with a long depth distance, and a different image is displayed on a second image surface with a short depth distance. Then, the second image surface in the foreground is moved and displayed in such a way as to follow the movement of the user's viewpoint.

For example, this viewpoint-following display screen is displayed on the left side of the user's viewpoint. If the user's viewpoint moves to the right, a viewpoint-following display surface also moves to the right, and if the user's viewpoint moves to the left, the viewpoint-following display surface also moves to the left.

However, a configuration with such a viewpoint-following display area has a problem in that when a user desires to view information displayed on the viewpoint-following display screen, the viewpoint-following display screen escapes from the user's sight as the user's viewpoint moves, so that the user cannot view details displayed on the viewpoint-following display screen.

That is, when the user attempts to view the viewpoint-following display screen displayed on the left side of the user's viewpoint, the viewpoint is moved to the left. As a result, the viewpoint-following display screen also moves to the left in accordance with the movement of the viewpoint, so that the user cannot view the details displayed on the viewpoint-following display screen.

CITATION LIST

Patent Document

Patent Document 1: Japanese Patent No. 6081839

SUMMARY OF THE INVENTION

Problems to be Solved by the Invention

The present disclosure has been made in view of, for example, the above problem, and an object of the present disclosure is to provide a display apparatus, a display control method, and a program that enable information displayed in a viewpoint-following display area to be easily checked in the display apparatus with the display area that moves in such a way as to follow a user's viewpoint.

Solutions to Problems

A first aspect of the present disclosure is a display apparatus including:
a control unit configured to control movement of a viewpoint-following display area that moves in accordance with movement of a user's point of regard, in which the control unit determines whether to cause the viewpoint-following display area to follow the user's point of regard or to stop the viewpoint-following display area from following the user's point of regard, according to a staying time of the user's point of regard.

In addition, a second aspect of the present disclosure is a display control method to be performed in a display apparatus,
the display apparatus including a control unit configured to control movement of a viewpoint-following display area that moves in accordance with movement of a user's point of regard, the method including:
causing the control unit to determine whether to cause the viewpoint-following display area to follow the user's point of regard or to stop the viewpoint-following display area from following the user's point of regard, according to a staying time of the user's point of regard.

Moreover, a third aspect of the present disclosure is a program for causing a display apparatus to perform display control,
the display apparatus including a control unit configured to control movement of a viewpoint-following display area that moves in accordance with movement of a user's point of regard, the program causing the control unit to perform:
a process of determining whether to cause the viewpoint-following display area to follow the user's point of regard or to stop the viewpoint-following display area from following the user's point of regard, according to a staying time of the user's point of regard.

Note that the program according to the present disclosure is a program that can be provided through, for example, a storage medium or a communication medium to be provided in a computer-readable form to an information processing apparatus or a computer system that can execute various program codes. As a result of providing such a program in a computer-readable form, a process corresponding to the program is implemented on the information processing apparatus or the computer system.

Still other objects, features, and advantages of the present disclosure will be apparent from more detailed descriptions based on embodiments of the present disclosure to be described later and the accompanying drawings. Note that in the present specification, the term "system" refers to a logical set configuration of a plurality of devices, and is not limited to one in which the devices of each configuration are in the same casing.

Effects of the Invention

According to the configuration of one embodiment of the present disclosure, a configuration is achieved in which it is possible to easily check information displayed in the viewpoint-following display area as a result of performing control of the movement of the viewpoint-following display area.

Specifically, for example, the control unit, which controls the movement of the viewpoint-following display area that moves in accordance with the movement of the user's point of regard, determines whether to cause the viewpoint-following display area to follow the user's point of regard or to stop the viewpoint-following display area from following the user's point of regard, according to the staying time of the user's point of regard. The display apparatus is configured as a three-dimensional display apparatus or a HUD that allows the viewpoint-following display area to be observed in front of a fixed display area. In a case where the staying time of the user's point of regard reaches or exceeds a specified time t set in advance, the control unit does not cause the viewpoint-following display area to follow the user's point of regard, but fixes the viewpoint-following display area for display. The specified time t is changed according to user input to the display apparatus or the steering of a vehicle.

With the present configuration, a configuration is achieved in which it is possible to easily check information displayed in the viewpoint-following display area as a result of performing control of the movement of the viewpoint-following display area.

Note that the effects described in the present specification are merely illustrative and not restrictive, and additional effects may also be achieved.

BRIEF DESCRIPTION OF DRAWINGS

FIG. 15 is a diagram showing a flowchart describing a process sequence for a process to be performed by the display apparatus.

FIG. 16 is a diagram showing a flowchart describing a process sequence for a process to be performed by the display apparatus.

FIG. 17 is a diagram describing a hardware configuration example of the display apparatus.

MODE FOR CARRYING OUT THE INVENTION

Details of a display apparatus, a display control method, and a program according to the present disclosure will be described below with reference to the drawings. Note that description will be provided in accordance with the following items.

1. Outline of Three-Dimensional Image Display Process and Viewpoint-Following Display Process
2. Outline of Process to Be Performed by Display Apparatus According to Present Disclosure
3. Details of Configuration and Process to Be Performed by Display Apparatus According to Present Disclosure
4. Embodiment of Setting Viewpoint-Following Display Area on Display Unit of Head-Up Display (HUD) of Vehicle
5. Other Embodiments
6. Example of Hardware Configuration of Display Apparatus
7. Summary of Configurations of Present Disclosure 1. Outline of Three-Dimensional Image Display Process and Viewpoint-Following Display Process First, an outline of a three-dimensional image display process and a viewpoint-following display process will be described.

Figure 1:
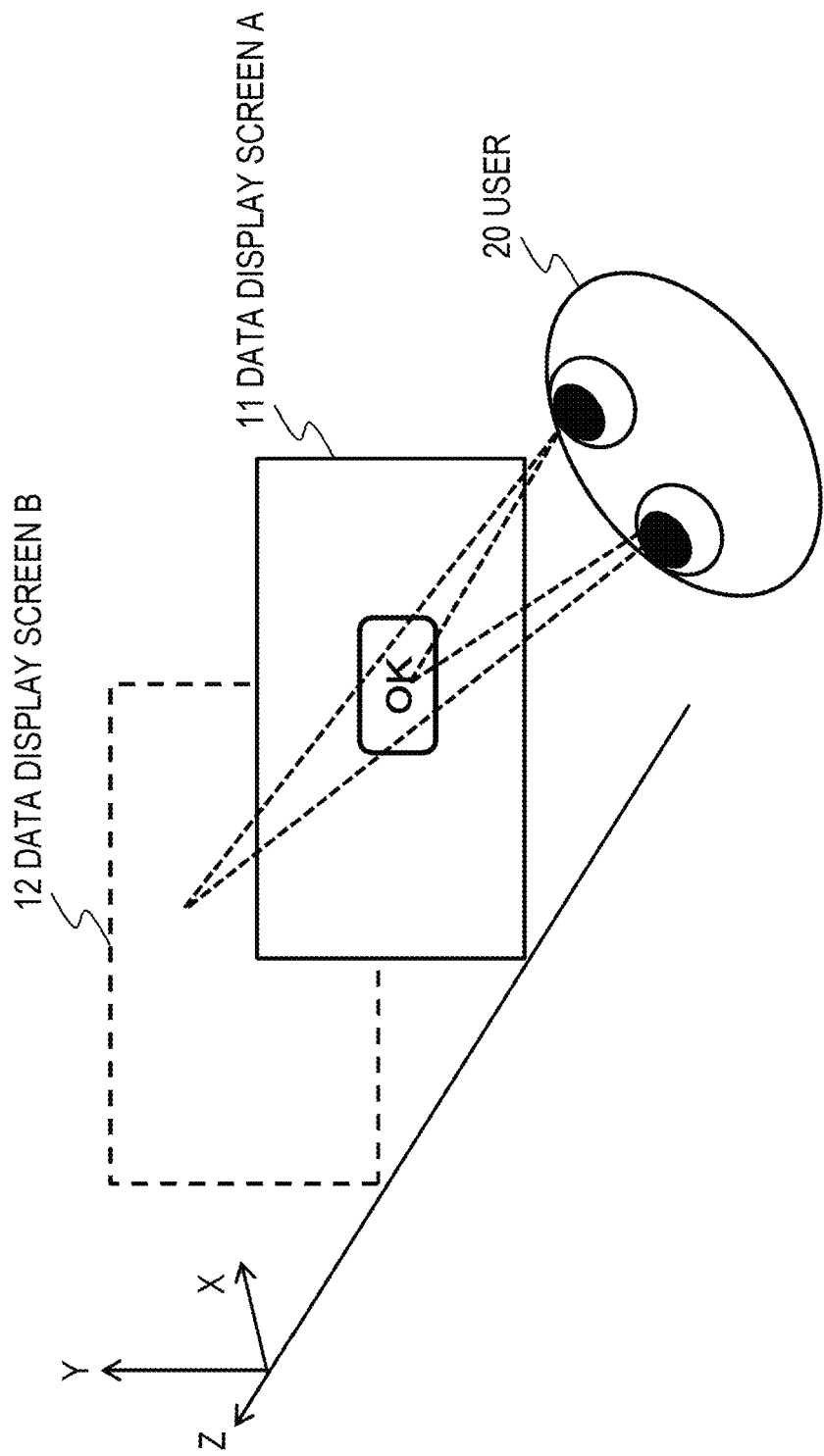
FIG. 1 is a diagram describing an outline of a three-dimensional image display process and a viewpoint-following display process.

FIG. 1 is a diagram showing an example of the three-dimensional image display process.

A configuration shown in FIG. 1 corresponds to a configuration described in Patent Document 1 (Japanese Patent No. 6081839) described above.

FIG. 1 is a diagram showing a conceptual diagram of an image to be displayed on a three-dimensional display apparatus. FIG. 1 shows a plurality of image surfaces to be displayed with different depths on the three-dimensional display apparatus.

The plurality of image surfaces refers to a data display screen A 11 and a data display screen B 12.

A user 20, who is a viewer/listener, visually recognizes that the data display screen A 11 is located in front of the data display screen B 12.

This can be achieved as a result of setting the screens A and B as images with different parallax amounts.

When the user 20 gazes at an operation button (OK) displayed on the data display screen A 11 in the foreground, a system detects that the user 20 has gazed at the operation button (OK), and performs a process similar to a process to be performed when the operation button (OK) displayed on the data display screen A 11 is pressed.

Thus, it is possible to perform various processes with eye-controlled input by using the three-dimensional image display apparatus.

Moreover, there is a configuration in which control is performed so that a single display area is moved and displayed in such a way as to follow movement of the user's viewpoint.

Figure 2:
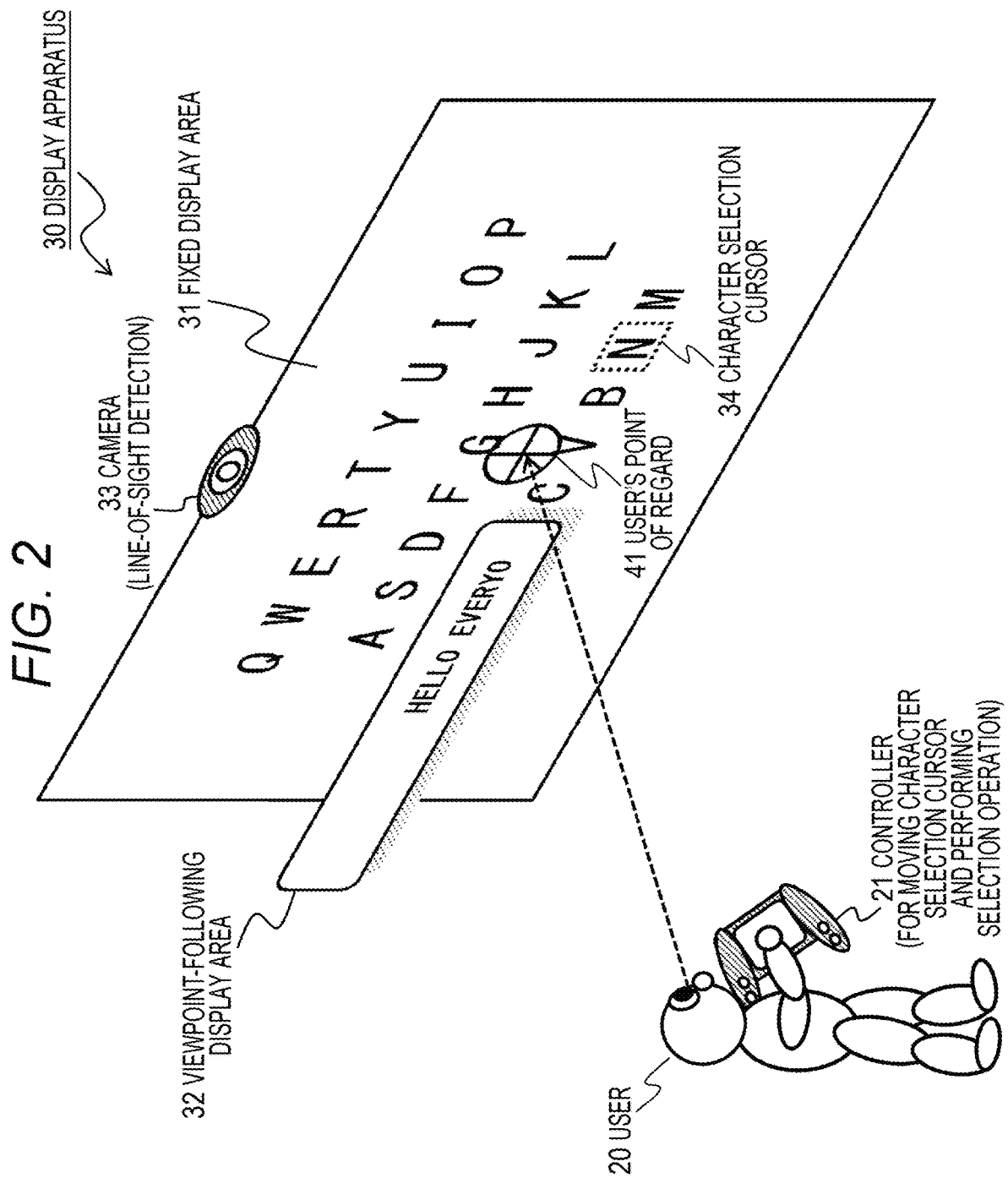
FIG. 2 is a diagram showing an example of a three-dimensional image display apparatus having a viewpoint-following display area.

FIG. 2 shows an example of a three-dimensional image display apparatus having a viewpoint-following display area.

A display apparatus 30 shown in FIG. 2 is an on-screen keyboard (OSK).

The display apparatus 30 has a fixed display area 31 and a viewpoint-following display area 32. The user 20 holds a controller 21. The user 20 moves a character selection cursor 34 in the fixed display area 31 to select a specific character from a character string displayed in the fixed display area 31 by using the controller 21, and presses an input determination button of the controller 21 to input the character.

An input character string is displayed in the viewpoint-following display area 32.

A control unit of the display apparatus 30 performs three-dimensional display control of each display area so that the user 20 can observe the viewpoint-following display area 32 at a position in front of the fixed display area 31, that is, a position closer to the user 20.

The display apparatus 30 observes the user's eyes by using, for example, a camera 33, and calculates the user's point of regard. This refers to a user's point of regard 41 shown in the drawing.

The control unit of the display apparatus 30 performs control so as to cause the viewpoint-following display area 32 to move in such a way as to follow the user's point of regard 41.

For example, as shown in the drawing, the control unit performs a process so as to display the viewpoint-following display area 32 on the left side of the user's point of regard 41 such that when the user's point of regard 41 moves to the right, the viewpoint-following display area 32 also moves to the right and when the user's point of regard 41 moves to the left, the viewpoint-following display area 32 also moves to the left.

Figure 3:
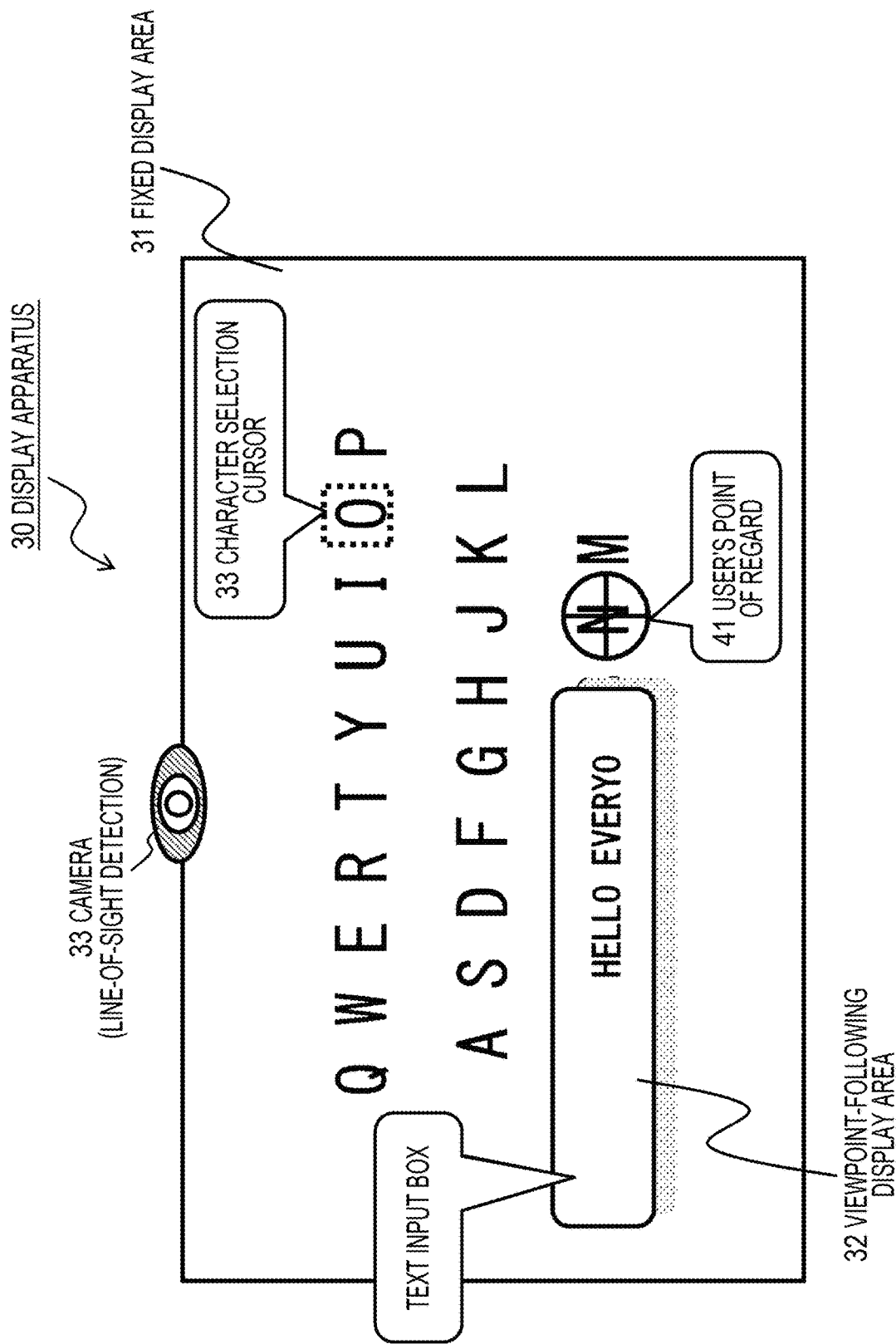
FIG. 3 is a diagram showing the example of the three-dimensional image display apparatus having the viewpoint-following display area.

FIG. 3 is a front view of the display apparatus 30 shown in FIG. 2. The fixed display area 31 is displayed on the display apparatus 30, and the viewpoint-following display area 32 is displayed in front of the fixed display area 31. The viewpoint-following display area 32 serves as a text input box for displaying an input text.

The viewpoint-following display area 32 is displayed at a position adjacent to the user's point of regard 41. The viewpoint-following display area 32 is displayed on the left side of the user's point of regard 41 in the example shown in the drawing.

A problem that occurs when the viewpoint-following display area 32 follows a viewpoint will be described with reference to FIG. 4.

Figure 4:
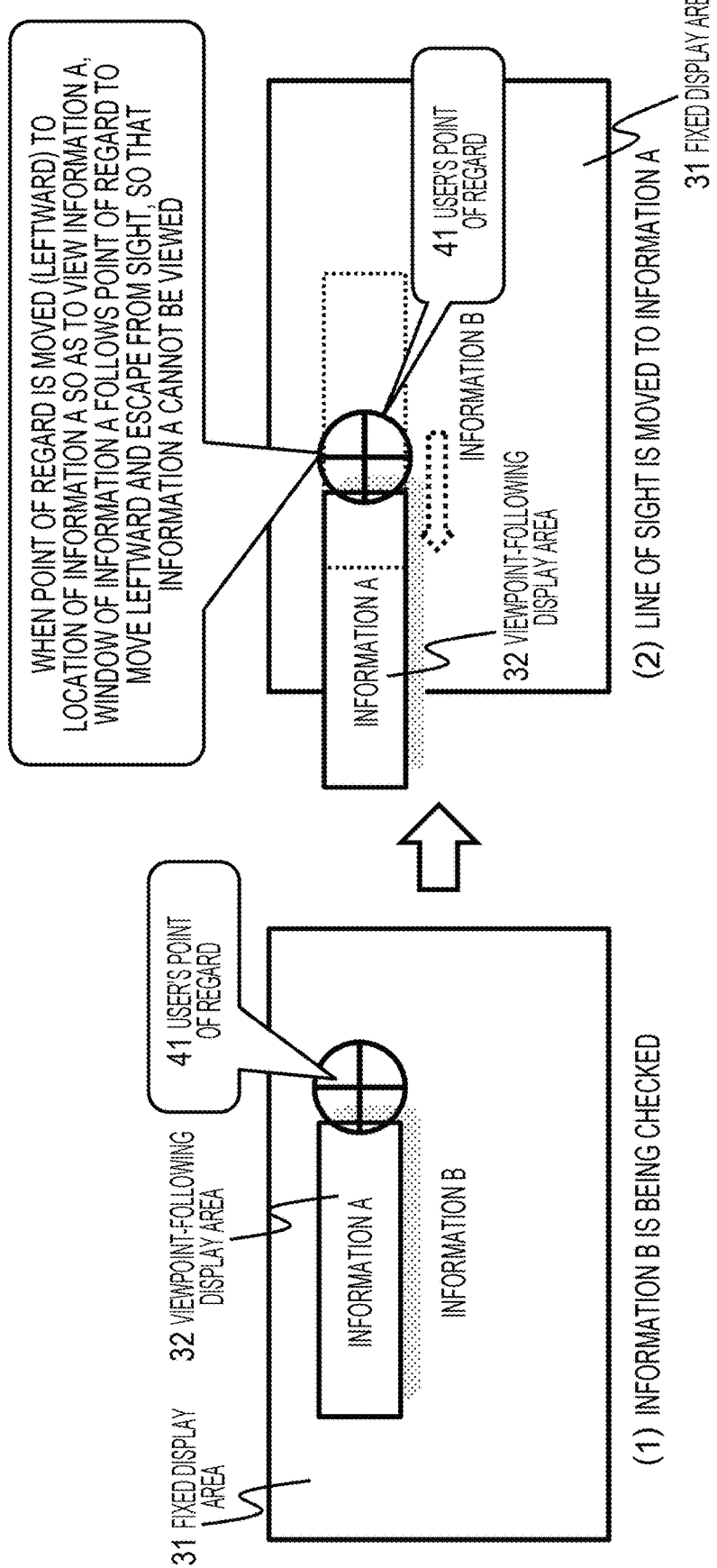
FIG. 4 is a diagram describing a problem that occurs when the viewpoint-following display area follows a viewpoint.

FIG. 4(1) shows an example in which the user 20 is checking information B displayed in the fixed display area 31, and the user's point of regard 41 is in the fixed display area 31. In this state, the viewpoint-following display area 32 is displayed on the left side of the user's point of regard 41.

There is nothing wrong with this state.

FIG. 4(2) shows a state in which the user 20 has moved the user's point of regard 41 to the left in an attempt to view information A that is a piece of data displayed in the viewpoint-following display area 32 located on the left side of the user's point of regard 41. When the user's point of regard 41 is moved to the left, the viewpoint-following display area 32 also moves to the left in such a way as to follow the movement of the user's point of regard 41.

That is, when the user 20 desires to view the viewpoint-following display screen itself and moves the user's point of regard 41 toward the viewpoint-following display area 32, the viewpoint-following display area 32 escapes from the user's sight in accordance with the movement of the user's point of regard 41. As a result, the user 20 cannot view contents of the viewpoint-following display area 32, that is, the information A.

2. Outline of Process to be Performed by Display Apparatus According to Present Disclosure Next, a description will be given of an outline of a process to be performed by the display apparatus according to the present disclosure.

The display apparatus according to the present disclosure solves the problem described with reference to FIG. 4, that is, a problem where the viewpoint-following display area escapes from the user's sight as the user's point of regard moves, so that the user cannot view the contents of the viewpoint-following display area.

An outline of processes to be performed by the display apparatus according to the present disclosure will be described with reference to FIGS. 5 and 6.

Figure 5:
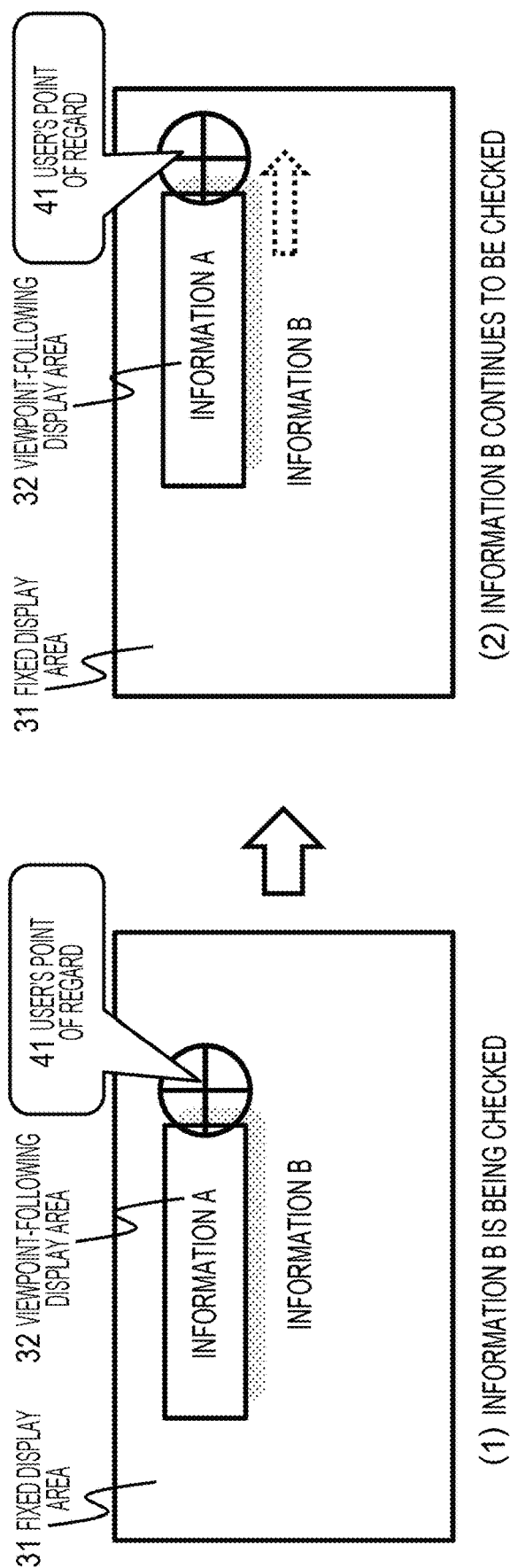
FIG. 5 is a diagram describing an outline of a process to be performed by a display apparatus according to the present disclosure.

FIG. 5 shows a display example of the three-dimensional display apparatus having the fixed display area 31 and the viewpoint-following display area 32, as in the example described with reference to FIG. 4.

FIG. 5(1) shows an example in which the user 20 is checking the information B displayed in the fixed display area 31, and the user's point of regard 41 is in the fixed display area 31. In this state, the viewpoint-following display area 32 is displayed on the left side of the user's point of regard 41.

FIG. 5(2) shows an example in which the user 20 moves the user's point of regard 41 to the right while continuously checking the information B displayed in the fixed display area 31, and the user's point of regard 41 is in the fixed display area 31. In this state, the viewpoint-following display area 32 moves rightward in such a way as to follow rightward movement of the user's point of regard 41, so that the viewpoint-following display area 32 is moved to a position on the immediate left side of the user's point of regard 41 for display.

In the example shown in FIG. 5, the user is continuously checking the information B displayed in the fixed display area 31. Thus, there is no problem.

Next, a process to be performed in a case where the user attempts to check the information A displayed in the viewpoint-following display area 32 will be described with reference to FIG. 6.

Figure 6:
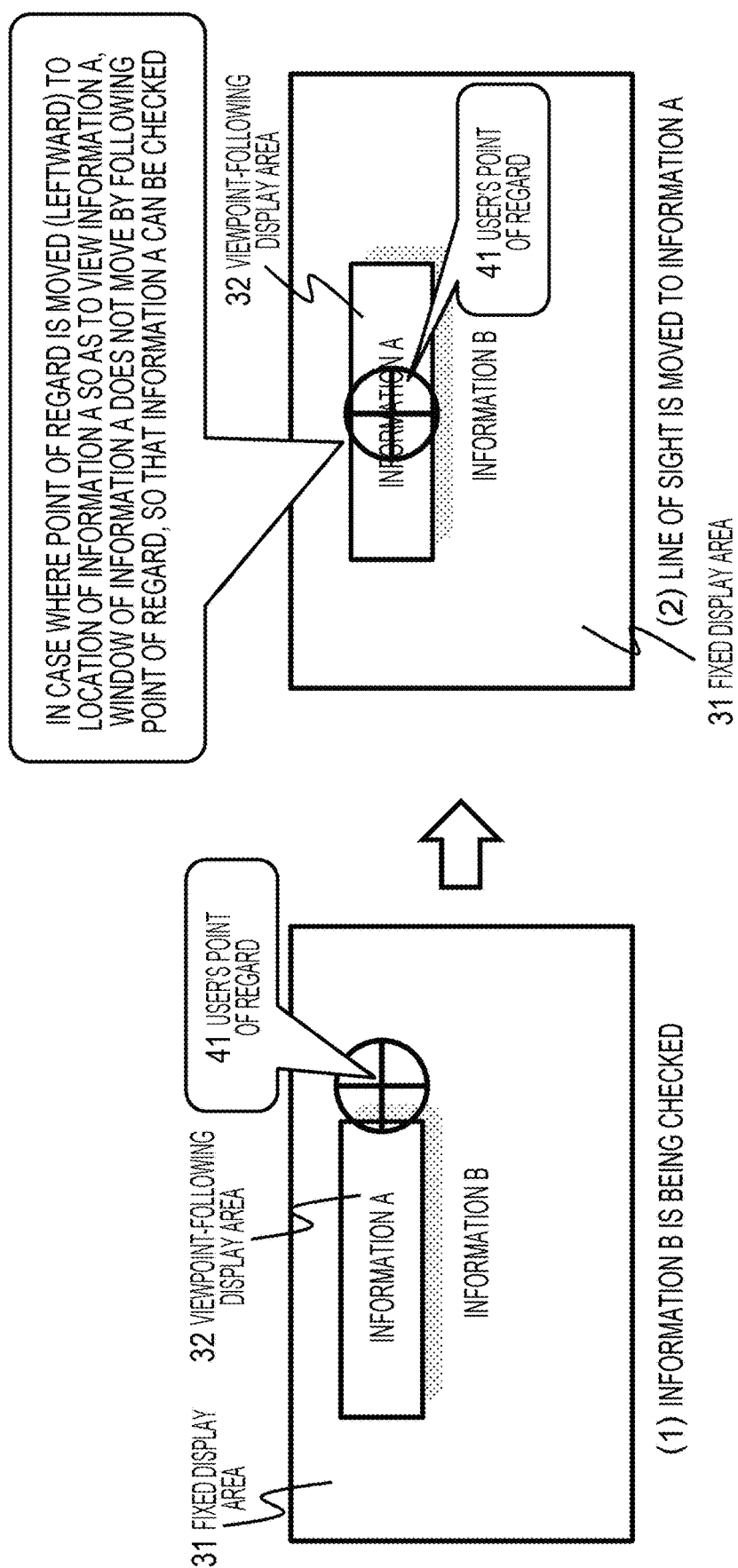
FIG. 6 is a diagram describing an outline of a process to be performed by the display apparatus according to the present disclosure.

FIG. 6 shows a display example of the three-dimensional display apparatus having the fixed display area 31 and the viewpoint-following display area 32, as in FIG. 5.

FIG. 6(1) shows an example in which the user 20 is checking the information B displayed in the fixed display area 31, and the user's point of regard 41 is in the fixed display area 31. In this state, the viewpoint-following display area 32 is displayed on the left side of the user's point of regard 41.

FIG. 6(2) shows an example in which the user 20 moves the user's point of regard 41 to the left and checks the information A in the viewpoint-following display area 32.

The display apparatus according to the present disclosure performs control so as not to cause the viewpoint-following display area 32 to follow the user's point of regard 41 under a certain condition.

That is, the viewpoint-following process of the viewpoint-following display area 32 is stopped under a predetermined condition. This control enables the user to smoothly move the user's point of regard 41 to the viewpoint-following display area 32 and check the information A in the viewpoint-following display area 32.

In order to control the execution and stop of the viewpoint-following process of the viewpoint-following display area 32, the display apparatus according to the present disclosure performs control by using the three-dimensional position of the user's point of regard and the convergence distance of the user's line of sight.

The convergence distance of the user's line of sight will be described with reference to FIG. 7.

Figure 7:
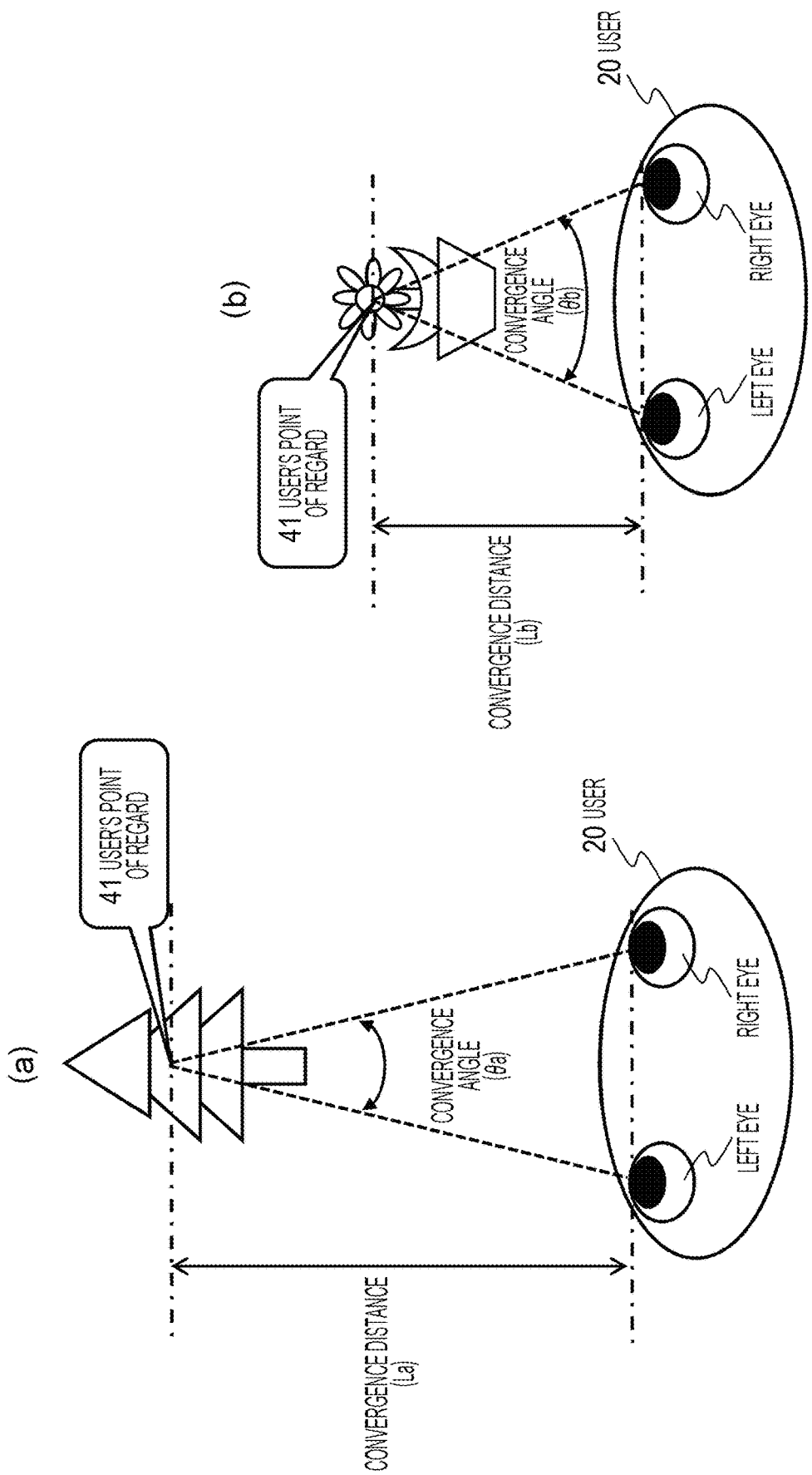
FIG. 7 is a diagram describing a convergence distance of a user's line of sight.

FIG. 7 shows two diagrams that differ in the distance between the user 20 and the user's point of regard 41.

In FIG. 7(a), the distance between the user 20 and the user's point of regard 41 is long. In FIG. 7 (b), the distance between the user 20 and the user's point of regard 41 is short.

The user 20 is looking at the point of regard 41 with right and left eyes. At this time, an angle formed by a straight line joining the left eye and the user's point of regard 41 and a straight line joining the right eye and the user's point of regard 41 is called a convergence angle.

Furthermore, the distance from the eyes of the user 20 to the user's point of regard 41 is called a convergence distance.

The convergence angle decreases as the user's point of regard moves away from the user, and increases as the user's point of regard approaches the user. The convergence distance increases as the user's point of regard moves away from the user, and decreases as the user's point of regard approaches the user.

In the example shown in FIG. 7, θa and La denote a convergence angle and a convergence distance, respectively, in the case of (a) in which the user's point of regard is far from the user. In addition, θb and Lb denote a convergence angle and a convergence distance, respectively, in the case of (b) in which the user's point of regard is close to the user. Then, the relationship between the convergence angle θa and the convergence angle θb and the relationship between the convergence distance La and the convergence distance Lb are expressed as follows.

$$\theta a < \theta b$$

$$La > Lb$$

The convergence angle and the convergence distance can be calculated from, for example, directions of lines of sight of both eyes analyzed on the basis of images of the left eye and right eye of the user 20 captured by the camera.

The display apparatus according to the present disclosure analyzes the directions of the lines of sight of both eyes of the user by using the camera provided in the display apparatus, and calculates the three-dimensional position of the user's point of regard and the convergence distance.

Movement of the line-of-sight-following display area is controlled by use of results of the calculation.

3. Details of Configuration and Process to be Performed by Display Apparatus According to Present Disclosure Next, described below are details of a configuration and a process to be performed by a display apparatus according to the present disclosure.

Figure 8:
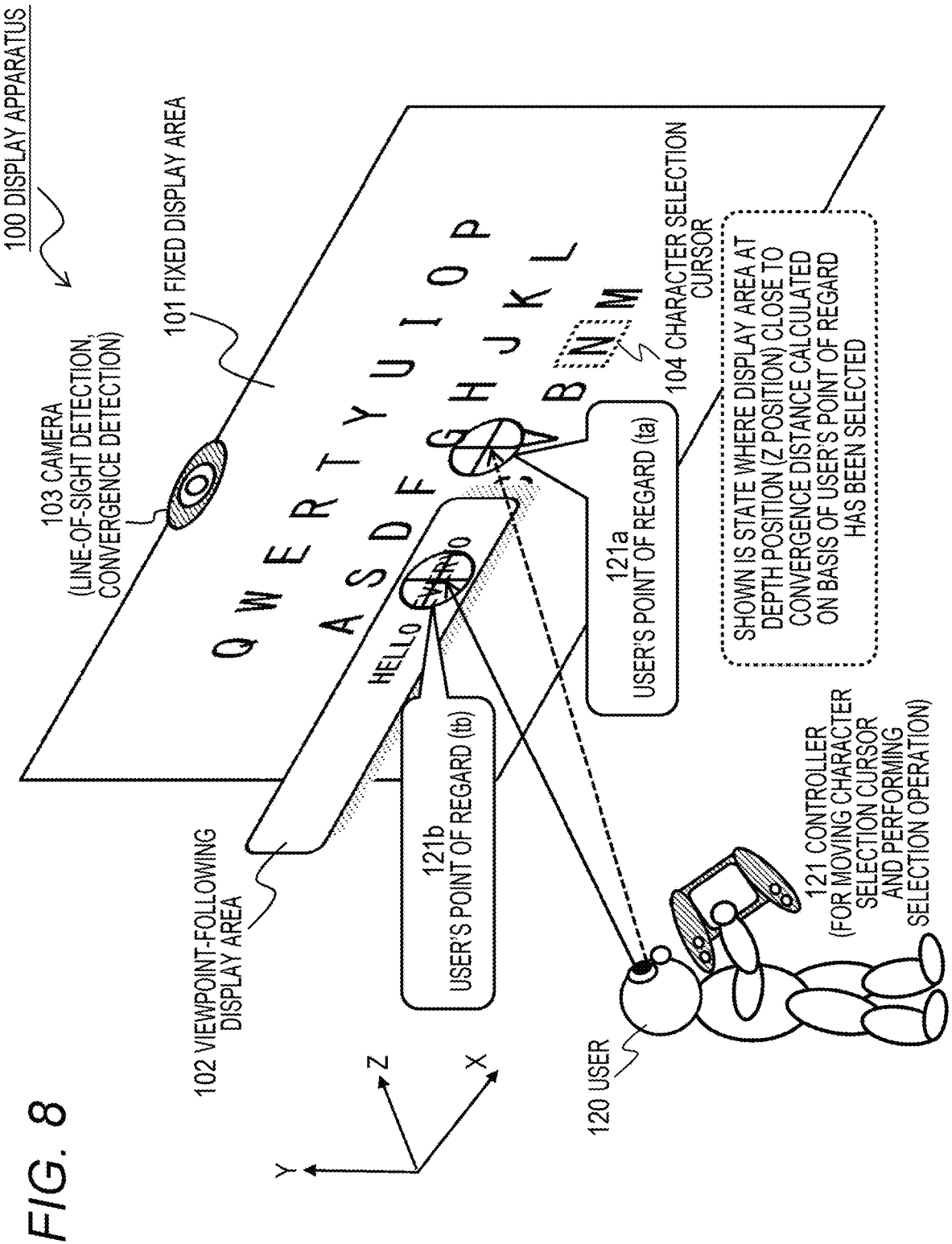
FIG. 8 is a diagram describing an example of a display apparatus according to the present disclosure.

FIG. 8 is a diagram showing an appearance of an example of a display apparatus 100 according to the present disclosure.

The display apparatus 100 shown in FIG. 8 is an on-screen keyboard (OSK) similar to that described above with reference to FIG. 2.

The display apparatus 100 has a fixed display area 101 and a viewpoint-following display area 102. A user 120 holds a controller 121. The user 120 moves a character selection cursor 104 in the fixed display area 101 to select a specific character from a character string displayed in the fixed display area 101 by using the controller 121, and presses an input determination button of the controller 121 to input the character.

An input character string is displayed in the viewpoint-following display area 102.

A control unit of the display apparatus 100 performs three-dimensional display control of each display area so that the user 120 can observe the viewpoint-following display area 102 at a position in front of the fixed display area 101, that is, a position closer to the user 120.

The display apparatus 100 observes the user's eyes by using, for example, a camera 103, and calculates a three-dimensional position of a user's point of regard 121, specifically, the three-dimensional position of the user's point of regard 121 including a convergence distance.

Note that as shown on the left side of FIG. 8, a horizontal right direction parallel to display surfaces of the display areas is defined as an X-axis, a vertically upward direction parallel to the display surfaces is defined as a Y-axis, and a direction perpendicular to the display surfaces of the display areas (a direction from the user 120 toward the display surfaces) is defined as a Z-axis.

Two points of regard, that is, a user's point of regard 121a at time (ta) and a user's point of regard 121b at time (t2) are shown in the drawing. These are user's points of regard at different times shown as reference.

The user 120 can observe both of information displayed in the fixed display area 101 and information displayed in the viewpoint-following display area 102 without any inconvenience.

The control unit of the display apparatus 100 performs control so as to cause the viewpoint-following display area 102 to move in such a way as to follow the user's point of regard 121.

In the example shown in FIG. 8, the viewpoint-following display area 102 is displayed on the left side of the user's point of regard 121. The control unit of the display apparatus 100 moves the viewpoint-following display area 102 to the right when the user's point of regard 121 moves to the right. In addition, the control unit of the display apparatus 100 performs a process of moving the viewpoint-following display area 102 to the left when the user's point of regard 121 moves to the left.

However, the control unit of the display apparatus 100 according to the present disclosure performs a process of fixing the viewpoint-following display area 102 without causing the viewpoint-following display area 102 to follow the user's point of regard 121 in a case where a predetermined condition is satisfied.

This control enables the user to move the point of regard into the viewpoint-following display area 102 and check data in the viewpoint-following display area 102.

Note that the display apparatus 100 shown as the present embodiment in FIG. 8 displays, in the fixed display area 101, a character string that can be input by the user 120 as in the configuration described above with reference to FIG. 2. The user 120 moves the character selection cursor 104 to select a specific character from a character string displayed in the fixed display area 101 by operating the controller 121 held in the user's hand, and presses an input determination button of the controller 121 to input the character. An input character string is displayed in the viewpoint-following display area 102.

Next, a configuration of the display apparatus 100 will be described with reference to FIG. 9.

Figure 9:
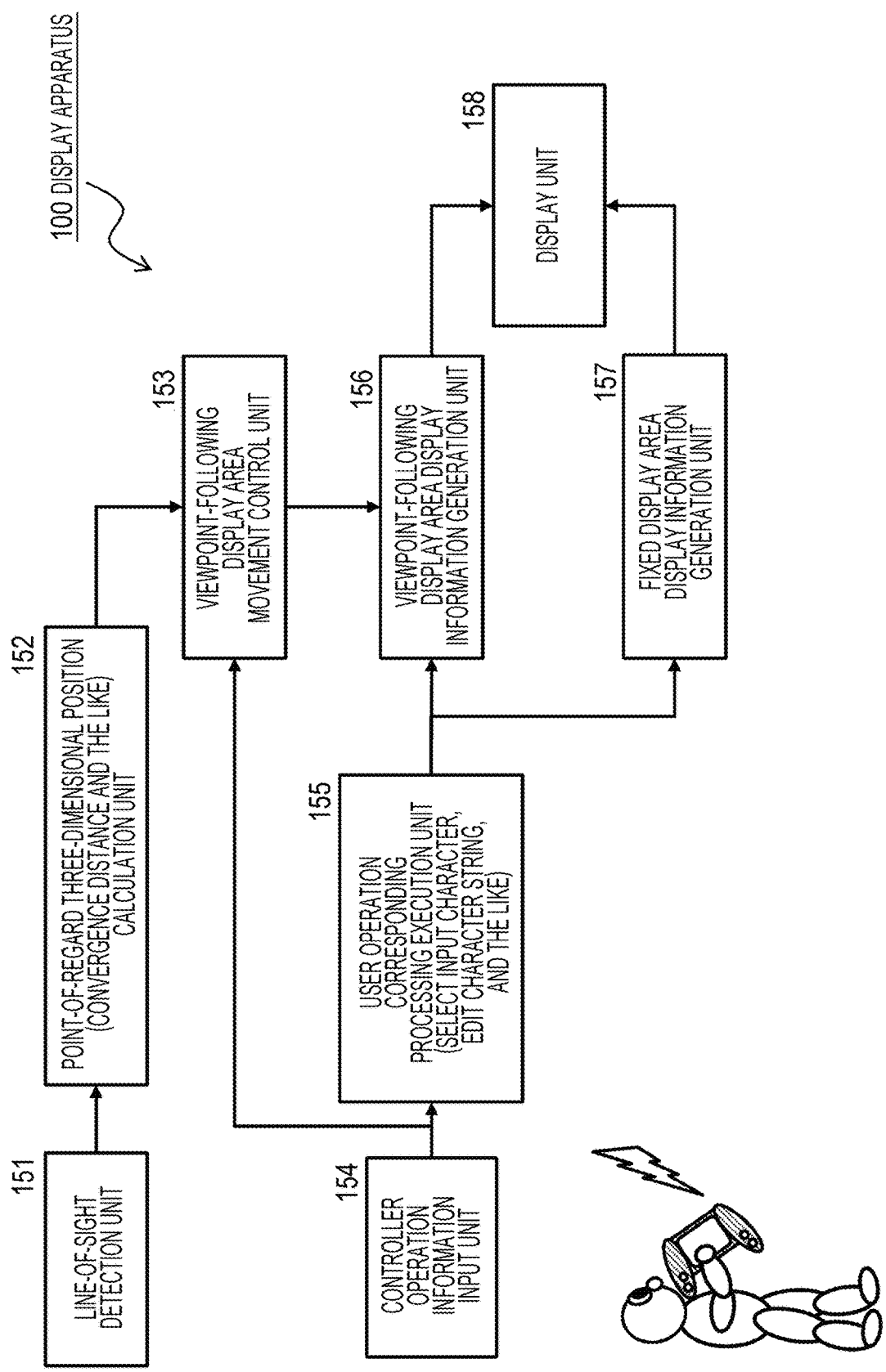
FIG. 9 is a diagram describing a configuration and processing examples of the display apparatus.

As shown in FIG. 9, the display apparatus 100 according to the present disclosure includes a line-of-sight detection unit 151, a point-of-regard three-dimensional position (convergence distance and the like) calculation unit 152, a viewpoint-following display area movement control unit 153, a controller operation information input unit 154, a user operation corresponding processing execution unit 155, a viewpoint-following display area information generation unit 156, a fixed display area display information generation unit 157, and a display unit 158.

The line-of-sight detection unit 151 detects the line of sight of the user 120. For example, the line-of-sight detection unit 151 is a camera. The line-of-sight detection unit 151 images eyeballs of the user's left eye and right eye, and captures an image that enables a direction of the line of sight of each eye to be detected on the basis of a direction of the eyeball.

Note that the line-of-sight detection unit 151 is not limited to the camera, and various other line-of-sight detection methods can be used. For example, the display apparatus 100 may be configured such that a line of sight is detected by use of a sensor such as an electro-oculogram (EOG) that measures the electric potentials of eyeballs.

Information on detection performed by the line-of-sight detection unit 151 is input to the point-of-regard three-dimensional position (convergence distance and the like) calculation unit 152.

The point-of-regard three-dimensional position (convergence distance and the like) calculation unit 152 calculates a three-dimensional position of a point of regard (user's point of regard) that the user is looking at on the basis of information on the directions of the lines of sight of both eyes of the user, the information being input from the line-of-sight detection unit 151.

The user's point of regard can be obtained as an intersection of the direction of the line of sight of the user's left eye and the direction of the line of sight of the user's right eye. The point-of-regard three-dimensional position (convergence distance and the like) calculation unit 152 calculates the three-dimensional position (x, y, z) of the point of regard.

For example, setting the position of the user's face as the origin (x, y, z)=(0, 0, 0), a horizontal right direction parallel to a display surface of the display apparatus is defined as an X-axis, an upward direction parallel to the display surface of the display apparatus is defined as a Y-axis, and a direction from the user toward the display surface of the display apparatus is defined as a Z-axis.

In this setting, the symbol "z" in the three-dimensional position (x, y, z) of the point of regard corresponds to the convergence distance.

Information on the three-dimensional position (x, y, z) of the point of regard calculated by the point-of-regard three-dimensional position (convergence distance and the like) calculation unit 152 is input to the viewpoint-following display area movement control unit 153.

The viewpoint-following display area movement control unit 153 controls movement of the viewpoint-following display area 102 by using the information on the three-dimensional position (x, y, z) of the point of regard calculated by the point-of-regard three-dimensional position (convergence distance and the like) calculation unit 152. Specifically, the viewpoint-following display area movement control unit 153 performs control by switching between control for causing the viewpoint-following display area 102 to move in such a way as to follow the user's point of regard 121 and control for fixing the viewpoint-following display area 102 without causing the viewpoint-following display area 102 to follow the user's point of regard 121.

Note that the viewpoint-following display area movement control unit 153 changes the control modes according to user operation information input by the controller operation information input unit 154.

A specific process sequence for this process will be described later with reference to a flowchart.

The controller operation information input unit 154 inputs information on operation of the controller 121 held by the user 120. Specifically, the information on operation of the controller 121 refers to information on operation such as movement of a cursor and determination of an input character.

The input information is input to the user operation corresponding processing execution unit 155. Moreover, the input information is also input to the viewpoint-following display area movement control unit 153.

The user operation corresponding processing execution unit 155 performs processing according to the user operation information input from the controller operation information input unit 154. Specifically, the user operation corresponding processing execution unit 155 performs, for example, a process of determining a display position of a cursor position in the fixed display area display information generation unit 157 according to the information on operation such as movement of a cursor and determination of an input character, and a process of determining a character string to be displayed in the viewpoint-following display area information generation unit 156 according to the information on the determination of an input character.

Results of the processes performed by the user operation corresponding processing execution unit 155 are input to the viewpoint-following display area information generation unit 156 and the fixed display area display information generation unit 157.

The viewpoint-following display area information generation unit 156 and the fixed display area display information generation unit 157 generate display information corresponding to respective display areas. That is, the viewpoint-following display area information generation unit 156 and the fixed display area display information generation unit 157 generate display information reflecting the results of the processes performed by the user operation corresponding processing execution unit 155.

The display unit 158 displays the display information corresponding to the respective display areas in the respective display areas, the display information being generated by the viewpoint-following display area information generation unit 156 and the fixed display area display information generation unit 157.

Next, a description will be given of a control sequence for control of the viewpoint-following display area 102 to be performed by the viewpoint-following display area movement control unit 153.

Figure 10:
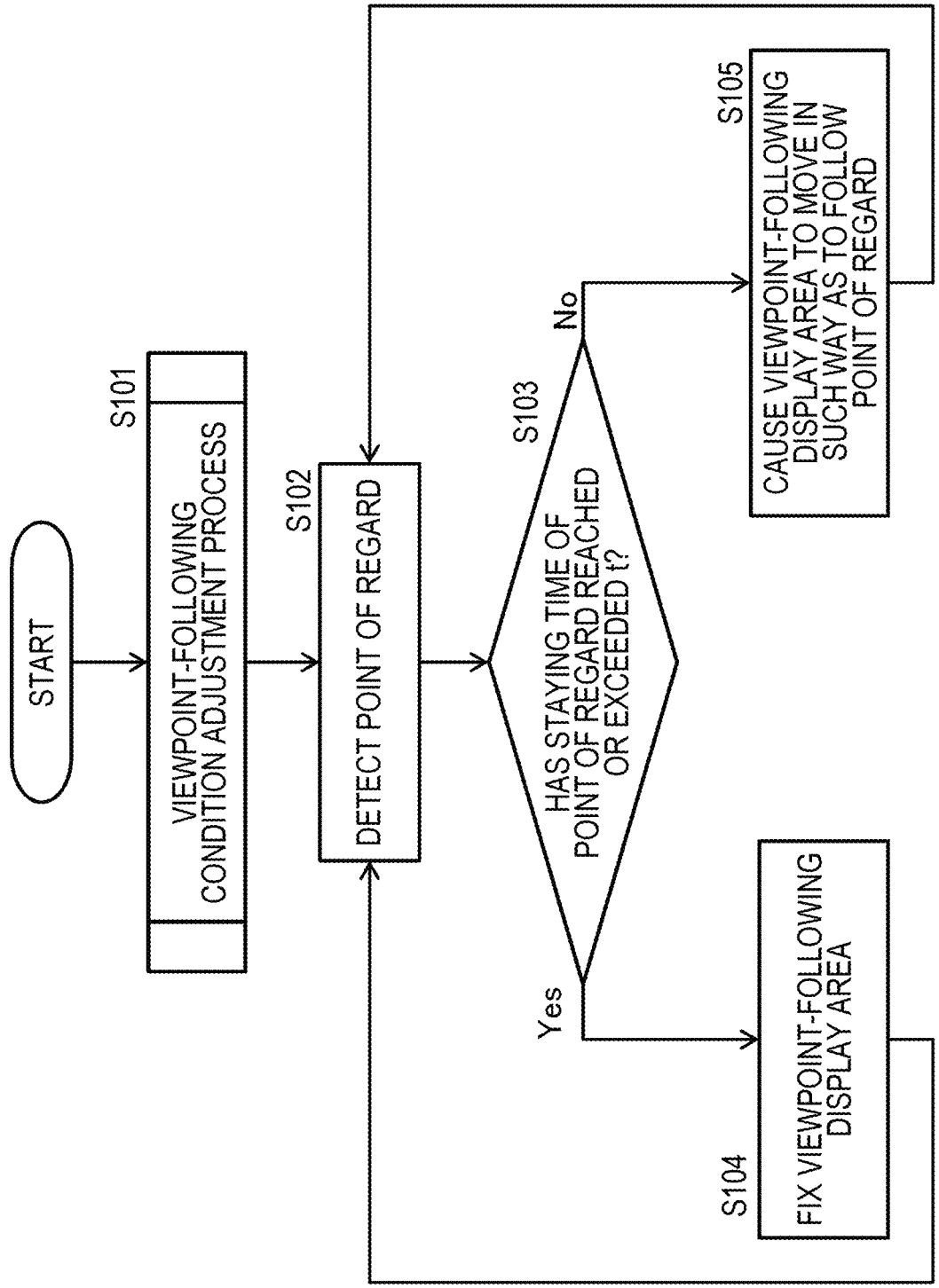
FIG. 10 is a diagram showing a flowchart describing a process sequence for a process to be performed by the display apparatus.
Figure 11:
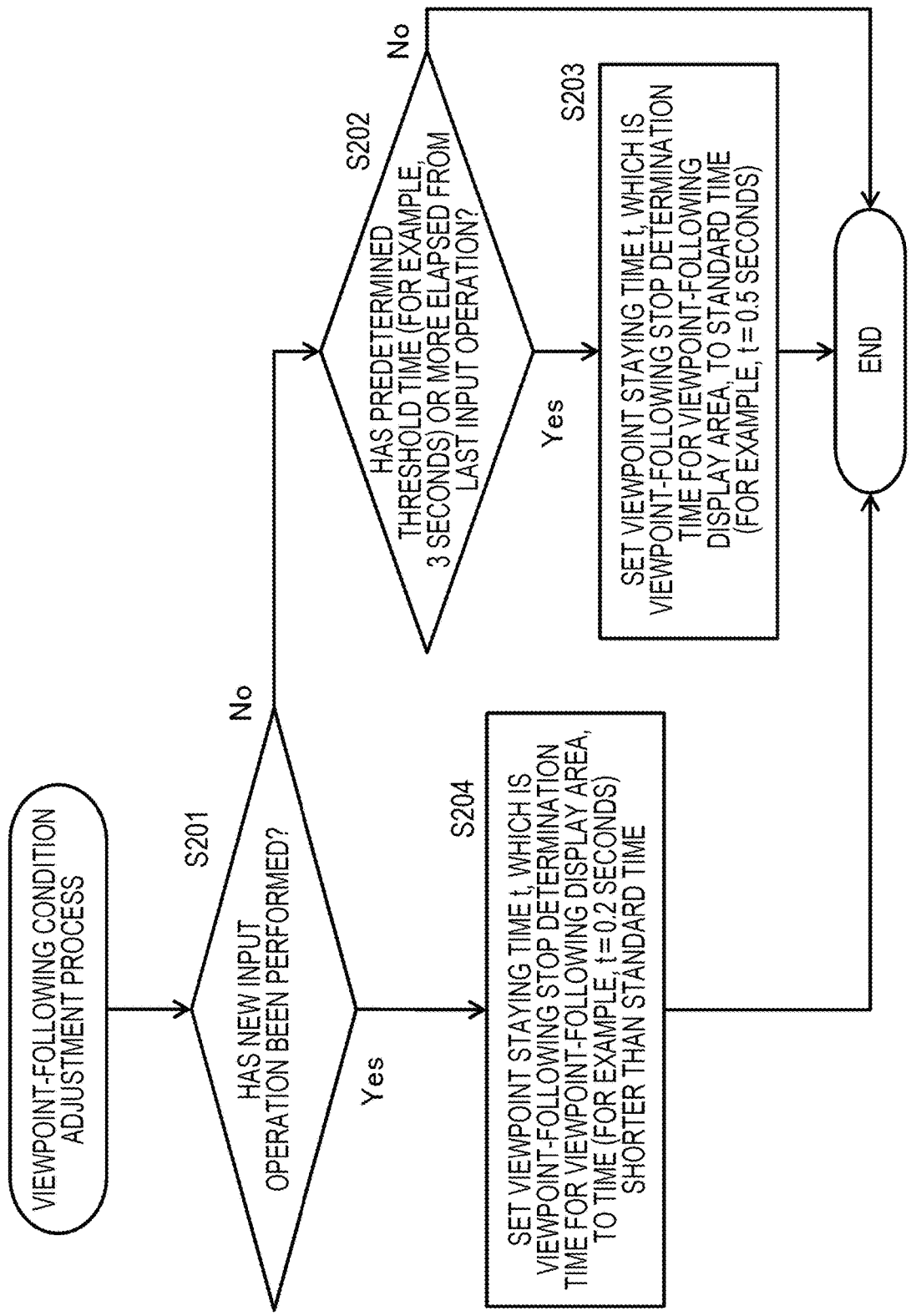
FIG. 11 is a diagram showing a flowchart describing a process sequence for a process to be performed by the display apparatus.

FIGS. 10 and 11 are flowcharts describing a control sequence for control of the viewpoint-following display area 102.

FIG. 10 shows a basic sequence for controlling movement of the viewpoint-following display area 102.

FIG. 11 shows a detailed sequence for a process of adjustment of the staying time of the user's point of regard, to be performed in step S101 shown in FIG. 10.

The processing according to the flows shown in FIGS. 10 and 11 can be performed according to a program stored in a storage unit of the display apparatus 100, and can be performed as, for example, a program execution process by a processor such as a CPU having a program execution function.

Processing in each step shown in the flowchart of FIG. 10 will be described below.

(Step S101)

First, a viewpoint-following condition adjustment process for the viewpoint-following display area 102 is performed in step S101.

This process is performed by the viewpoint-following display area movement control unit 153.

The following processes of steps S102 to S105 are performed according to a viewpoint-following condition set in step S101.

A detailed sequence for the viewpoint-following condition adjustment process in step S101, that is, the viewpoint-following condition adjustment process for the viewpoint-following display area 102 will be described with reference to the flowchart shown in FIG. 11.

(Step S201)

First, the viewpoint-following display area movement control unit 153 determines in step S201 whether or not new user operation information has been input to the controller operation information input unit 154.

In a case where no new user operation information has been input, the process proceeds to step S202, and in a case where new user operation information has been input, the process proceeds to step S204.

(Step S202)

In a case where it is determined in step S201 that no new user operation information has been input to the controller operation information input unit 154, it is determined in step S202 whether or not a predetermined threshold time of, for example, 3 seconds or more has elapsed from the user's last input operation on the controller.

In a case where it is determined that the elapsed time has reached or exceeded the predetermined threshold time of, for example, 3 seconds, the process proceeds to step S203.

In a case where it is determined that the elapsed time has not reached or exceeded the predetermined threshold time of, for example, 3 seconds, the process is terminated as it is. In this case, the current setting is continued as it is.

(Step S203)

In step S202, in a case where it is determined that the predetermined threshold time of, for example, 3 seconds or more has elapsed from the user's last input operation on the controller, a process of step S203 is performed.

In step S203, the viewpoint-following display area movement control unit 153 sets a viewpoint staying time t, which is a viewpoint-following stop determination time for the viewpoint-following display area, to a standard time (for example, t=0.5 seconds).

(Step S204)

Meanwhile, in a case where it is determined in step S201 that new user operation information has been input to the controller operation information input unit 154, a process of step S204 is performed.

In step S204, the viewpoint-following display area movement control unit 153 sets the viewpoint staying time t, which is the viewpoint-following stop determination time for the viewpoint-following display area, to a time (for example, t=0.2 seconds) shorter than the standard time (for example, t=0.5 seconds).

In step S101 of the flow shown in FIG. 10, the process according to the flow shown in FIG. 11 is performed.

The process to be performed according to the flow shown in FIG. 11 is a process of changing the setting of the viewpoint staying time t, which is the viewpoint-following stop determination time for the viewpoint-following display area. Specifically, the following processes are performed.

(a) In a case where a new user operation has been detected, the viewpoint staying time t, which is the viewpoint-following stop determination time for the viewpoint-following display area 102, is set to a time (for example, t=0.2 seconds) shorter than the standard time (for example, t=0.5 seconds).

(b) In a case where no new user operation has been detected and a state in which no operation is performed continues for a specified time (for example, 3 seconds) or longer, the viewpoint staying time t, which is the viewpoint-following stop determination time for the viewpoint-following display area 102, is set to the standard time (for example, t=0.5 seconds).

The processes (a) and (b) will be performed.

Note that a staying state of the user's point of regard includes not only a case where the user's viewpoint is completely fixed, but also a case where the user's viewpoint stays in a certain narrow range.

For example, in a case where the user's point of regard is located near the center of a single character displayed in the fixed display area shown in FIG. 8, it is determined that the user's point of regard is in the staying state unless the user's point of regard moves to the center of an adjacent character.

In step S102 and subsequent steps of the flow shown in FIG. 10, the process is performed with either the setting (a) or (b) above, that is, the process is performed on the assumption that the viewpoint staying time t, which is the viewpoint-following stop determination time for the viewpoint-following display area, is set to either of the following:

viewpoint staying time t=standard time (for example, t=0.5 seconds), or viewpoint staying time t=time (for example, t=0.2 seconds) shorter than standard time.

Processing in step S102 and the subsequent steps will be described.

(Step S102)

In step S102, the user's point of regard is detected.

This process is performed by the point-of-regard three-dimensional position (convergence distance and the like) calculation unit 152 shown in FIG. 9.

The point-of-regard three-dimensional position (convergence distance and the like) calculation unit 152 calculates a three-dimensional position of a point of regard (user's point of regard) that the user is looking at on the basis of information on the directions of the lines of sight of both eyes of the user, the information being input from the line-of-sight detection unit 151.

As described above, the user's point of regard can be obtained as an intersection of the direction of the line of sight of the user's left eye and the direction of the line of sight of the user's right eye. The point-of-regard three-dimensional position (convergence distance and the like) calculation unit 152 sets the position of, for example, the user's face as the origin (x, y, z)=(0, 0, 0), and calculates the three-dimensional position (x, y, z) of the point of regard. The symbol "z" corresponds to the convergence distance.

(Step S103)

Next, in step S103, it is determined whether or not the staying time of the user's point of regard, that is, the staying time for which the user's point of regard stays still in the fixed display area 101 or the viewpoint-following display area 102, has reached or exceeded the staying time t set in step S101.

In a case where the staying time of the user's point of regard has reached or exceeded the staying time t set in step S101, the process proceeds to step S104.

Meanwhile, in a case where the staying time of the user's point of regard has not reached or exceeded the staying time t set in step S101, that is, in a case where the user's point of regard has moved within a time less than the time t, the process proceeds to step S105.

(Step S104)

In step S103, in a case where the staying time of the user's point of regard has reached or exceeded the staying time t set in step S101, the process proceeds to step S104.

The viewpoint-following display area movement control unit 153 fixes the viewpoint-following display area 102 in step S104. That is, the viewpoint-following display area movement control unit 153 performs a process of fixing the viewpoint-following display area 102 in a current display area for display such that the viewpoint-following display area 102 does not follow the movement of the user's point of regard.

At this timing, the user can check information displayed in the viewpoint-following display area 102 by moving the point of regard from the fixed display area 101 to the viewpoint-following display area 102.

(Step S105)

Meanwhile, in step S103, in a case where the staying time of the user's point of regard is less than the staying time t set in step S101, the process proceeds to step S105.

In step S105, the viewpoint-following display area movement control unit 153 performs control so that the viewpoint-following display area 102 moves in such a way as to follow the movement of the user's point of regard.

As a result of performing the processes described with reference to the flows shown in FIGS. 10 and 11, the user 120 can surely check the information in the fixed display area 101 and the viewpoint-following display area 102 according to the user's intention.

An example of processing to be performed when the point of regard is moved from the fixed display area 101 to the viewpoint-following display area 102 will be described with reference to FIG. 12.

Figure 12:
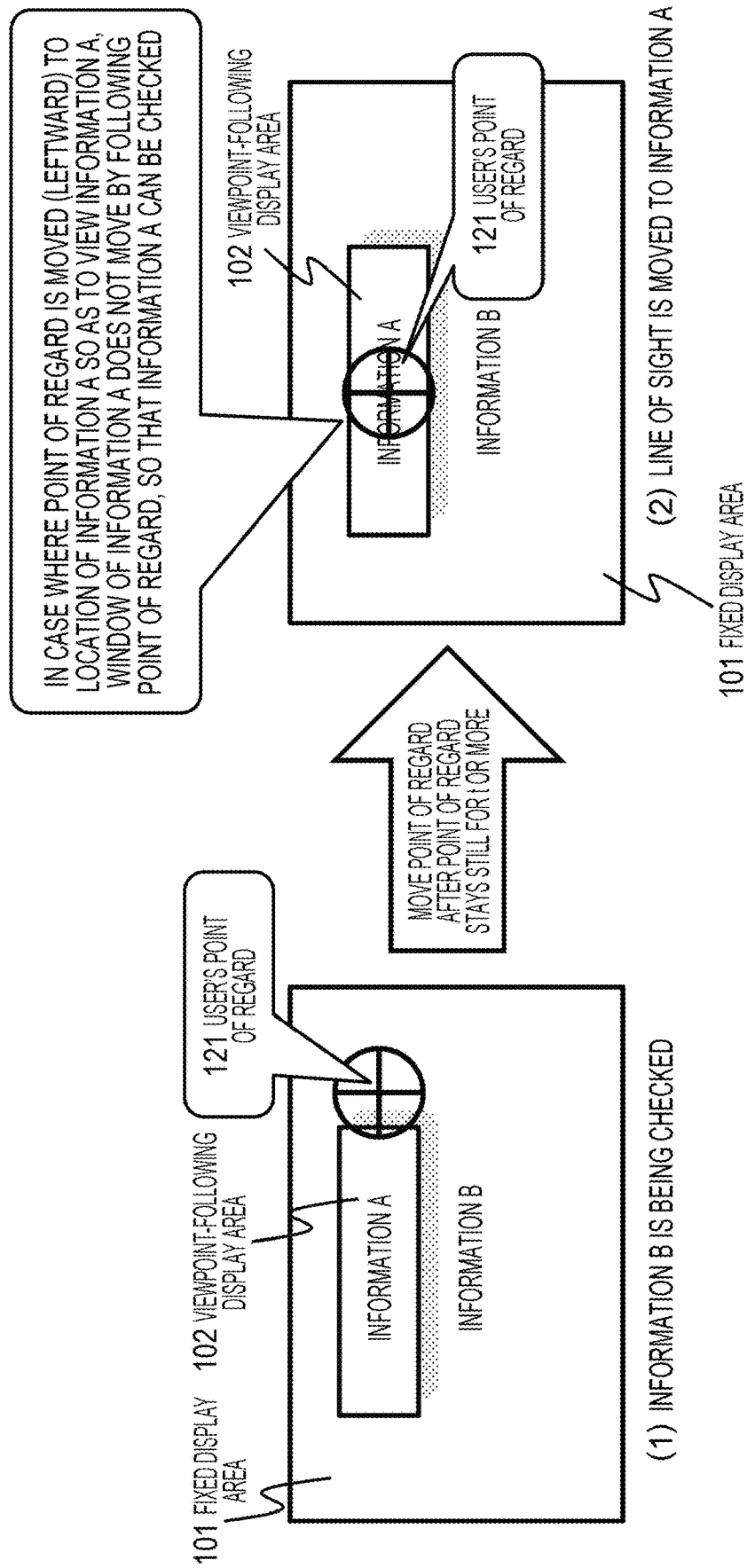
FIG. 12 is a diagram describing an outline of a process to be performed by the display apparatus according to the present disclosure.

FIG. 12 shows a processing example similar to the processing example described above with reference to FIG. 6 and other drawings.

FIG. 12(1) shows an example in which the user 120 is checking the information B displayed in the fixed display area 101, and the user's point of regard 121 is in the fixed display area 101. In this state, the viewpoint-following display area 102 is displayed on the left side of the user's point of regard 121.

In this state, the user 120 stops the user's point of regard 121 and does not move the user's point of regard 121 for the specified staying time t of, for example, 0.5 seconds. As a result of the process of causing the point of regard to stay, the viewpoint-following display area 102 is stopped from moving in such a way as to follow the user's point of regard 121 with a delay, and is fixed.

After that, the user 120 moves the user's point of regard 121 to the left, that is, moves the user's point of regard 121 to an information display area of the viewpoint-following display area 102.

This state corresponds to a state shown in FIG. 12(2).

As a result of this process, the user 120 can check the information in the viewpoint-following display area 102.

Note that the specified staying time t is changed depending on the state of operation input to the controller 121 by the user 120.

As described above with reference to the flow of FIG. 11, the staying time t is changed to either of the following settings depending on the state of operation input to the controller 121 by the user 120.

(a) In a case where a new user operation has been detected, the viewpoint staying time t, which is the viewpoint-following stop determination time for the viewpoint-following display area 102, is set to a time (for example, t=0.2 seconds) shorter than the standard time (for example, t=0.5 seconds).

(b) In a case where no new user operation has been detected and a state in which no operation is performed continues for a specified time (for example, 3 seconds) or longer, the viewpoint staying time t, which is the viewpoint-following stop determination time for the viewpoint-following display area 102, is set to the standard time (for example, t=0.5 seconds).

The processes (a) and (b) will be performed.

As a result of this change process, the viewpoint staying time t, which is the viewpoint-following stop determination time for the viewpoint-following display area 102, is set shorter while the user is performing input operation by means of the controller. For example, when a staying time of 0.2 seconds is detected during an input operation, the viewpoint-following display area 102 is fixed.

While inputting a text by selecting a character in the fixed display area 101, the user 120 often moves a viewpoint to the viewpoint-following display area 102 to check an input character. In this case, the viewpoint staying time t is set shorter, so that the user 120 can frequently switch between fixation and movement, and smoothly alternate between inputting a text and checking the input text.

Meanwhile, in a case where the user 120 performs no operation input by means of the controller 121 for a predetermined time of, for example, 3 seconds or more, the viewpoint staying time t, which is the viewpoint-following stop determination time for the viewpoint-following display area 102, is set to the standard time of, for example, 0.5 seconds.

This is a process corresponding to, for example, a case where it takes time to select an input character from the fixed display area 101 or a case where the user 120 is thinking up an input sentence. In such a case, switching between causing the viewpoint-following display area 102 to follow the viewpoint and stopping the viewpoint-following movement is not frequently performed, so as to reduce unnecessary switching processing.

As described above, the display apparatus 100 according to the present disclosure performs the processes described with reference to the flows shown in FIGS. 10 and 11. That is, the display apparatus 100 is configured such that a process of causing the viewpoint-following display area 102 to move in such a way as to follow the user's point of regard 121 and a process of stopping the viewpoint-following movement are switched and performed. As a result, the user 120 can surely check the information in the fixed display area 101 and the viewpoint-following display area 102 according to the user's intention.

4. Embodiment of Setting Viewpoint-Following Display Area on Display Unit of Head-Up Display (HUD) of Vehicle Next, a description will be given of 4. an embodiment of setting a viewpoint-following display area on a display unit of a head-up display (HUD) of a vehicle.

Figure 13:
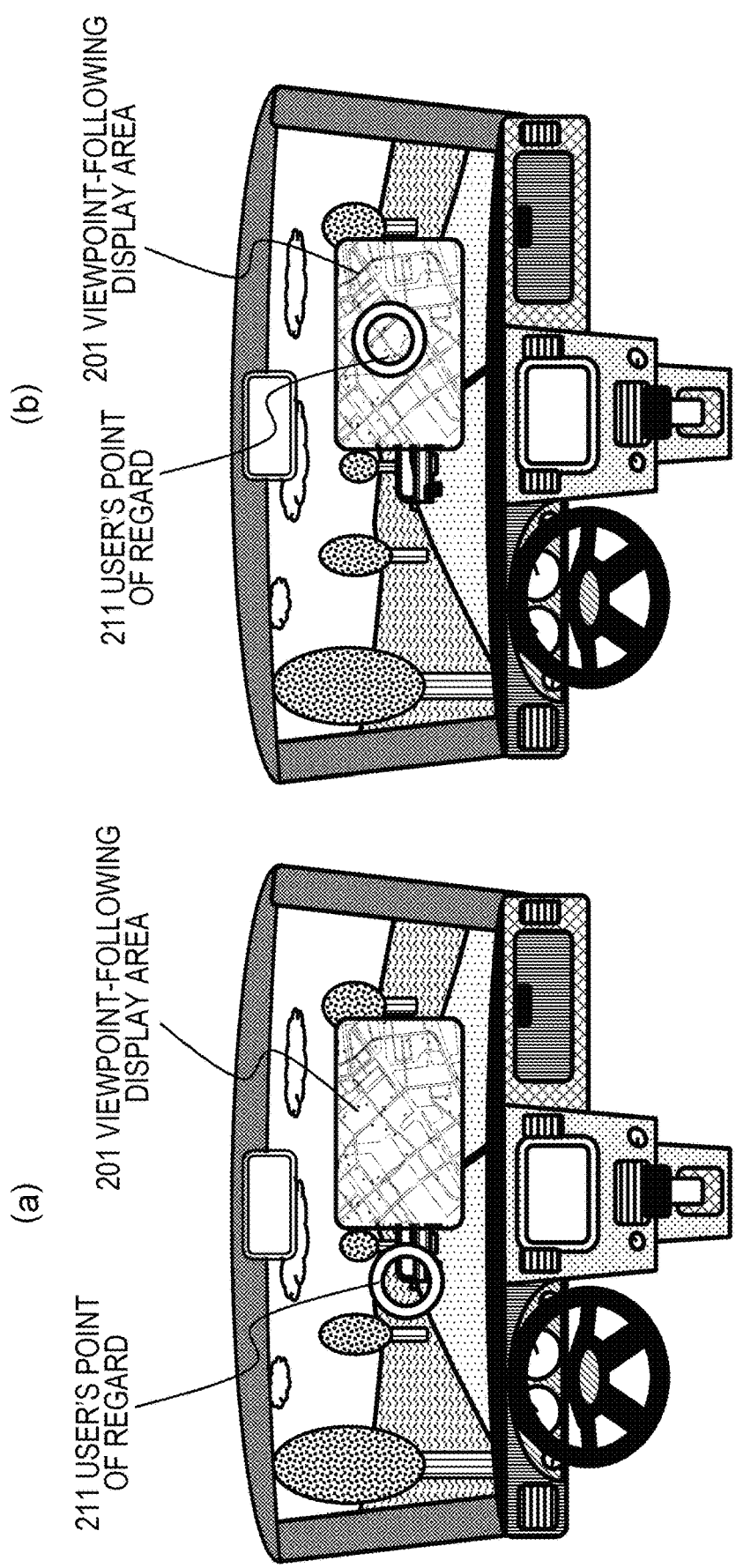
FIG. 13 is a diagram describing an outline of a process to be performed by the display apparatus according to the present disclosure.

As shown in FIG. 13, a viewpoint-following display area 201 is displayed as a head-up display (HUD) in a window portion in front of a driver's seat.

For example, map data are displayed in the viewpoint-following display area 201.

The viewpoint-following display area 201 is basically controlled so that the viewpoint-following display area 201 moves in such a way as to follow a user's point of regard 211 of a user who is a driver.

This basic configuration is similar to that in the example of the on-screen keyboard (OSK) described above with reference to FIG. 8 and the subsequent drawings.

Also in the present embodiment, control is performed in which the user's point of regard 211 is caused to stay at a specific location for a predetermined time or longer, that is, for a predetermined staying time t or longer so that the viewpoint-following movement of the viewpoint-following display area 201 is stopped and the viewpoint-following display area 201 is displayed in a fixed area.

As a result, it is possible to check a map displayed in the viewpoint-following display area 201 by moving the user's point of regard 211 of FIG. 13(a) to the right as shown in FIG. 13(b).

However, in a case where, for example, the viewpoint-following display area 201 is on the right side of the user's point of regard 211 as shown in the drawing, there arises a problem where a right-front part of the user's view is blocked by the viewpoint-following display area 201 when the driver attempts to turn to the right in driving the vehicle.

In order to solve this problem, steering information on the user (driver) is input, and an area for displaying the viewpoint-following display area 201 is changed or switching between showing and hiding is performed in the present embodiment.

Figure 14:
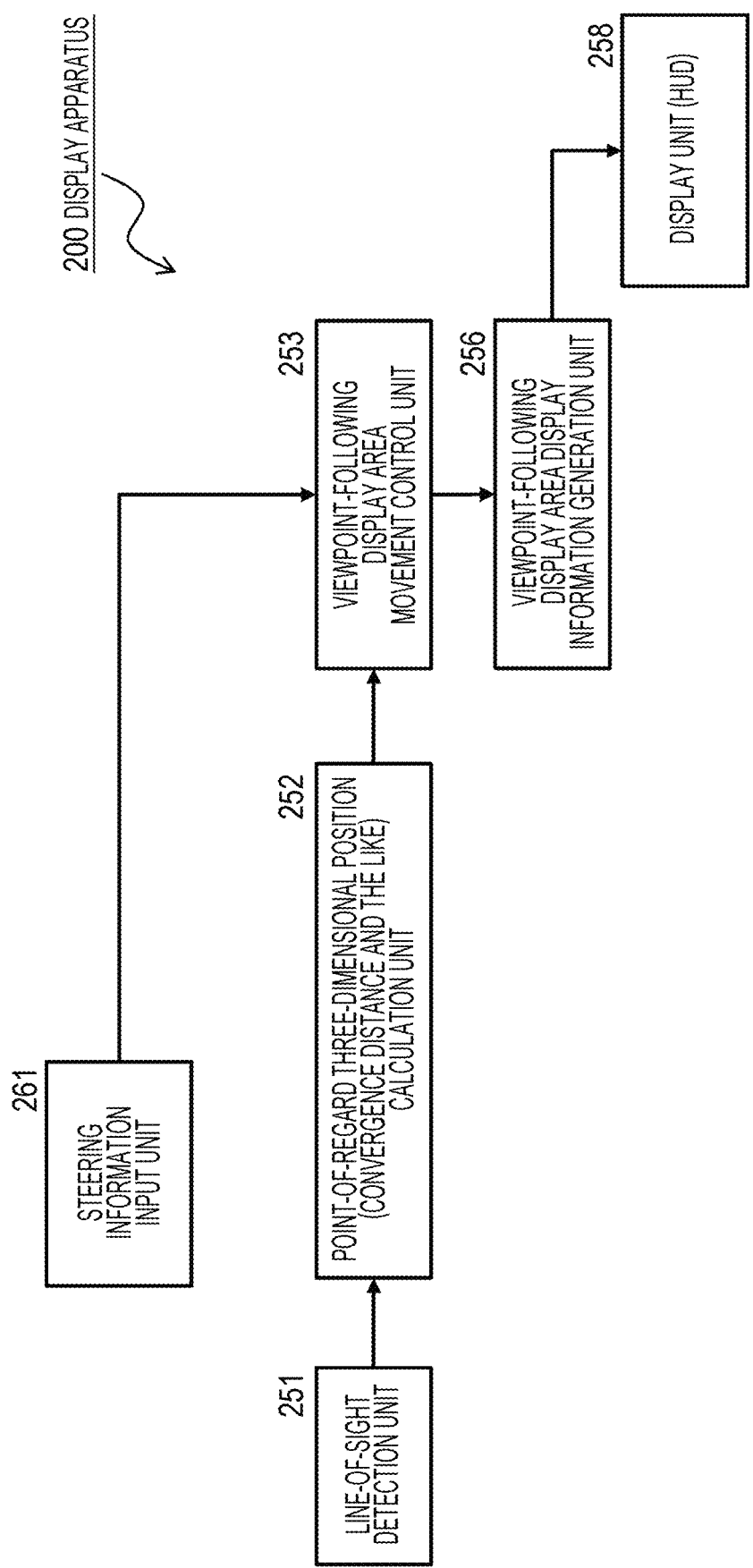
FIG. 14 is a diagram describing a configuration and processing examples of a display apparatus.

FIG. 14 is a block diagram showing a configuration example of a display apparatus 200 in the present embodiment.

A configuration of the display apparatus 200 shown in FIG. 14 will be described.

The display apparatus 200 includes a line-of-sight detection unit 251, a point-of-regard three-dimensional position (convergence distance and the like) calculation unit 252, a viewpoint-following display area movement control unit 253, a viewpoint-following display area information generation unit 256, a display unit (HUD) 258, and a steering information input unit 261.

The line-of-sight detection unit 251 detects the line of sight of the driver (user). For example, the line-of-sight detection unit 251 is a camera. The line-of-sight detection unit 251 images eyeballs of the user's left eye and right eye, and captures an image that enables a direction of the line of sight of each eye to be detected on the basis of a direction of the eyeball.

Note that the line-of-sight detection unit 251 is not limited to the camera, and various other line-of-sight detection methods can be used. For example, the display apparatus 200 may be configured such that a line of sight is detected by use of a sensor such as an electro-oculogram (EOG) that measures the electric potentials of eyeballs.

Information on detection performed by the line-of-sight detection unit 251 is input to the point-of-regard three-dimensional position (convergence distance and the like) calculation unit 252.

The point-of-regard three-dimensional position (convergence distance and the like) calculation unit 252 calculates a three-dimensional position of a point of regard (user's point of regard) that the user is looking at on the basis of information on the directions of the lines of sight of both eyes of the user, the information being input from the line-of-sight detection unit 251.

As described above, the user's point of regard can be obtained as an intersection of the direction of the line of sight of the user's left eye and the direction of the line of sight of the user's right eye. The point-of-regard three-dimensional position (convergence distance and the like) calculation unit 252 calculates the three-dimensional position (x, y, z) of the point of regard. The three-dimensional position (x, y, z) of the point of regard is obtained on the basis of the position of the user's face set as the origin (x, y, z)=(0, 0, 0). The symbol "z" corresponds to the convergence distance.

Information on the three-dimensional position (x, y, z) of the point of regard calculated by the point-of-regard three-dimensional position (convergence distance and the like) calculation unit 252 is input to the viewpoint-following display area movement control unit 253.

The viewpoint-following display area movement control unit 253 controls movement of the display unit (HUD) 258 (=viewpoint-following display area 201) by using the information on the three-dimensional position (x, y, z) of the point of regard calculated by the point-of-regard three-dimensional position (convergence distance and the like) calculation unit 252. Specifically, the viewpoint-following display area movement control unit 253 performs control by switching between control for causing the viewpoint-following display area 201 to move in such a way as to follow the user's point of regard 121 and control for fixing the viewpoint-following display area 201 without causing the viewpoint-following display area 201 to follow the user's point of regard 121.

Moreover, the viewpoint-following display area movement control unit 253 controls the movement and display of the display unit (HUD) 258 (=viewpoint-following display area 201) according to the steering information on the user that is input from the steering information input unit 261.

For example, when the user turns a steering wheel to the right, the viewpoint-following display area 201 displayed on the right side of the user's point of regard 211 as shown in FIG. 13 is moved and displayed above or below the user's point of regard 211. Alternatively, the display of the viewpoint-following display area 201 is stopped. That is, a process of, for example, hiding the viewpoint-following display area 201 is performed.

These processes enable the user (driver) to view circumstances in a traveling direction without being disturbed by the viewpoint-following display area 201.

The steering information input unit 261 inputs the steering information on the user (driver) to the viewpoint-following display area movement control unit 253.

The viewpoint-following display area information generation unit 256 generates display information to be displayed on the display unit (HUD) 258 (=viewpoint-following display area 201).

The display unit (HUD) 258 (=viewpoint-following display area 201) displays display information, such as map information, generated by the viewpoint-following display area information generation unit 256.

Next, described below is a control sequence for control of the display unit (HUD) 258 (=viewpoint-following display area 201) to be performed by the viewpoint-following display area movement control unit 253.

FIGS. 15 to 16 are flowcharts describing a control sequence for control of the viewpoint-following display area 201.

FIG. 15 shows a basic sequence for the control of movement of the viewpoint-following display area 201.

FIG. 16 shows a detailed sequence for a process of adjustment of the staying time of the user's point of regard, to be performed in step S201 shown in FIG. 15.

The processing according to the flows shown in FIGS. 15 and 16 can be performed according to a program stored in a storage unit of the display apparatus 200, and can be performed as, for example, a program execution process by a processor such as a CPU having a program execution function.

Processing in each step shown in the flow of FIG. 15 will be described below.

(Step S301)

First, a viewpoint-following condition adjustment process for the viewpoint-following display area 201 is performed in step S301.

This process is performed by the viewpoint-following display area movement control unit 253.

The following processes of steps S302 to S305 are performed according to a viewpoint-following condition set in step S301.

A detailed sequence for the viewpoint-following condition adjustment process in step S301, that is, the viewpoint-following condition adjustment process for the viewpoint-following display area 201 will be described with reference to the flowchart shown in FIG. 16.

(Step S401)

First, the viewpoint-following display area movement control unit 253 determines in step S401 whether or not steering information on steering by the user has been input from the steering information input unit 261, with a rotation angle equal to or greater than a predetermined rotation angle.

In a case where such steering information has been input, the process proceeds to step S402, and in a case where such steering information has not been input, the process proceeds to step S404.

(Step S402)

In a case where it is determined in step S401 that the steering information with a rotation angle equal to or greater than the predetermined rotation angle has been input from the steering information input unit 261, the viewpoint-following display area movement control unit 253 determines in step S402 whether or not the viewpoint-following display area 201 is being displayed in the same direction as the traveling direction of the vehicle.

In a case where the viewpoint-following display area 201 is being displayed in the same direction as the traveling direction of the vehicle, the process proceeds to step S403.

In a case where the viewpoint-following display area 201 is not being displayed in the same direction as the traveling direction of the vehicle, the process ends as it is. In this case, the current setting is continued as it is.

(Step S403)

In a case where it is determined in step S402 that the viewpoint-following display area 201 is being displayed in the same direction as the traveling direction of the vehicle, step S403 is performed.

In step S403, the viewpoint-following display area movement control unit 253 sets the viewpoint staying time t, which is the viewpoint-following stop determination time for the viewpoint-following display area, to a time (for example, t=1.0 second) longer than a standard time (for example, t=0.2 seconds). Moreover, the viewpoint-following display area movement control unit 253 changes the display position of the viewpoint-following display area 201, or stops displaying the viewpoint-following display area 201 as necessary.

Changing the display position of the viewpoint-following display area 201 and stopping displaying the viewpoint-following display area 201 refer to a process in which the viewpoint-following display area 201 displayed in a direction in which the user has turned the steering wheel is moved and displayed above or below the user's point of regard 211 and a process of stopping displaying the viewpoint-following display area 201, respectively, as described above with reference to FIG. 13.

These processes enable the user (driver) to view circumstances in the traveling direction without being disturbed by the viewpoint-following display area 201.

(Step S404)

Meanwhile, in a case where it is determined in step S401 that the steering information with a rotation angle equal to or greater than the predetermined rotation angle has not been input from the steering information input unit 261, the viewpoint-following display area movement control unit 253 performs a process of step S404.

In step S404, the viewpoint-following display area movement control unit 253 determines whether or not a predetermined threshold time of, for example, 3 seconds or more has elapsed since the user returned the steering wheel to a neutral state.

In a case where it is determined that the elapsed time has reached or exceeded the predetermined threshold time of, for example, 3 seconds, the process proceeds to step S405.

In a case where it is determined that the elapsed time has not reached or exceeded the predetermined threshold time of, for example, 3 seconds, the process is terminated as it is. In this case, the current setting is continued as it is.

(Step S405)

In a case where it is determined in step S404 that the predetermined threshold time of, for example, 3 seconds or more has elapsed since the user returned the steering wheel to the neutral state, a process of step S405 is performed.

In step S405, the viewpoint-following display area movement control unit 253 sets the viewpoint staying time t, which is the viewpoint-following stop determination time for the viewpoint-following display area, to the standard time (for example, t=0.2 seconds).

In step S201 of the flow shown in FIG. 15, the process according to the flow shown in FIG. 16 is performed.

The process to be performed according to the flow shown in FIG. 15 is a process of changing the setting of the viewpoint staying time t, which is the viewpoint-following stop determination time for the viewpoint-following display area. Specifically, the following processes are performed.

(a) In a case where the user (driver) has turned the steering wheel at an angle equal to or greater than the predetermined angle with respect to the neutral position and the viewpoint-following display area 201 is being displayed in a direction in which the steering wheel has been turned, the viewpoint staying time t, which is the viewpoint-following stop determination time for the viewpoint-following display area 201, is set to a time (for example, t=1.0 second) longer than the standard time (for example, t=0.2 seconds).

Moreover, the viewpoint-following display area movement control unit 253 changes the display position of the viewpoint-following display area 201, or stops displaying the viewpoint-following display area 201 as necessary.

(b) In a case where the user (driver) has not turned the steering wheel at an angle equal to or greater than the predetermined angle with respect to the neutral position and a specified time (for example, 3 seconds) or longer has elapsed since the steering wheel was returned to the neutral position, the viewpoint staying time t, which is the viewpoint-following stop determination time for the viewpoint-following display area 201, is set to the standard time (for example, t=0.2 seconds).

The processes (a) and (b) will be performed.

In step S302 and subsequent steps of the flow shown in FIG. 15, the process is performed with either the setting (a) or (b) above, that is, the process is performed on the assumption that the viewpoint staying time t, which is the viewpoint-following stop determination time for the viewpoint-following display area, is set to either of the following:

viewpoint staying time t=standard time (for example, t=0.2 seconds), or viewpoint staying time t=time (for example, t=1.0 second) longer than standard time.

Processing in step S302 and the subsequent steps will be described.

(Step S302)

In step S302, the user's point of regard is detected.

This process is performed by the point-of-regard three-dimensional position (convergence distance and the like) calculation unit 252 shown in FIG. 14.

The point-of-regard three-dimensional position (convergence distance and the like) calculation unit 252 calculates a three-dimensional position of a point of regard (user's point of regard) that the user is looking at on the basis of information on the directions of the lines of sight of both eyes of the user, the information being input from the line-of-sight detection unit 21.

As described above, the user's point of regard can be obtained as an intersection of the direction of the line of sight of the user's left eye and the direction of the line of sight of the user's right eye. The point-of-regard three-dimensional position (convergence distance and the like) calculation unit 252 sets the position of, for example, the user's face as the origin (x, y, z)=(0, 0, 0), and calculates the three-dimensional position (x, y, z) of the point of regard. The symbol "z" corresponds to the convergence distance.

(Step S303)

Next, in step S303, it is determined whether or not the staying time of the user's point of regard, that is, the staying time for which the user's point of regard stays still, has reached or exceeded the staying time t set in step S301.

In a case where the staying time of the user's point of regard has reached or exceeded the staying time t set in step S301, the process proceeds to step S304.

Meanwhile, in a case where the staying time of the user's point of regard has not reached or exceeded the staying time t set in step S301, that is, in a case where the user's point of regard has moved within a time less than the time t, the process proceeds to step S305.

(Step 3204)

In step S303, in a case where the staying time of the user's point of regard has reached or exceeded the staying time t set in step S301, the process proceeds to step S304.

The viewpoint-following display area movement control unit 253 fixes the viewpoint-following display area 201 in step S304. That is, the viewpoint-following display area movement control unit 253 performs a process of fixing the viewpoint-following display area 201 in a current display area for display such that the viewpoint-following display area 201 does not follow the movement of the user's point of regard.

The user can check the information, such as a map, displayed in the viewpoint-following display area 201 by moving the point of regard to the viewpoint-following display area 201 at this timing.

(Step S305)

Meanwhile, in step S303, in a case where the staying time of the user's point of regard is less than the staying time t set in step S301, the process proceeds to step S305.

In step S305, the viewpoint-following display area movement control unit 253 performs control so that the viewpoint-following display area 201 moves in such a way as to follow the movement of the user's point of regard.

Moreover, the viewpoint-following display area movement control unit 253 changes the display position of the viewpoint-following display area 201, or stops displaying the viewpoint-following display area 201 as necessary.

As a result of performing the processes described with reference to the flows shown in FIGS. 15 and 16, the user 120 can surely check the information in the viewpoint-following display area 201 according to the user's intention.

Furthermore, in a case where the viewpoint-following display area 201 is located in a direction in which the user intends to make a turn by turning the steering wheel, the staying time of the viewpoint is shortened, and a process of step S304 is performed. Here, the viewpoint-following display area 201 moves in such a way as to escape from the user's sight in the traveling direction of the vehicle according to the movement of the user's point of regard. Moreover, the changing of the display position of the viewpoint-following display area 201 or the stopping of displaying the viewpoint-following display area 201 is also performed as necessary.

Here, the term "as necessary" is based on the assumption of, for example, a case where it is determined that the user's point of regard moves quickly and will catch up with the viewpoint-following display area 201. In such a case, the viewpoint-following display area movement control unit 253 performs a process of changing the display position of the viewpoint-following display area 201, or a process of stopping displaying the viewpoint-following display area 201.

Specifically, the process of changing the display position of the viewpoint-following display area 201 and the process of stopping displaying the viewpoint-following display area 201 refer to the process in which the viewpoint-following display area 201 displayed in the direction in which the user has turned the steering wheel is moved and displayed above or below the user's point of regard 211 and the process of stopping displaying the viewpoint-following display area 201, respectively, as described above with reference to FIG. 13.

These processes enable the user (driver) to view circumstances in the traveling direction without being disturbed by the viewpoint-following display area 201.

5. Other Embodiments

Next, other embodiments will be described.

In the above-described embodiments, the movement of the viewpoint-following display area is controlled on the basis of the staying state of the user's point of regard. Alternatively, for example, either the information in the fixed display area or the information in the viewpoint-following display area may be designated as information to be viewed, according to the user's gesture or voice.

Examples of using an on-screen keyboard (OSK) and a head-up display (HUD) have been cited in the above-described embodiments. Meanwhile, the configurations and processes of the present disclosure can be used in various other display apparatuses.

For example, the configurations and processes of the present disclosure can also be used for setting a menu selection (weapon selection or the like) screen as the viewpoint-following area in a game machine or the like.

Furthermore, the user's point of regard may be displayed on a screen, and the distance to the display screen may be displayed for each of the fixed display area and the viewpoint-following display area. For example, settings can be configured such that it is possible to display "m" or "inch" by switching between "m" and "inch".

Furthermore, regarding whether to view the fixed display area or the viewpoint-following display area, information may be displayed such that an information area can be selected from among information areas that can be selected, and the convergence distance of the user's viewpoint may be used for selecting the information area.

Note that configurations in which "z" in the three-dimensional information of the user's point of regard, that is, the convergence distance is used have been described in the above embodiments, but control may be performed by use of the convergence angle.

Furthermore, in a case where no convergence distance or convergence angle can be measured on the basis of the user's line of sight, control may be performed by use of the position of a line of sight.

The viewpoint-following display area described in each of the above-described embodiments is set to be displayed in front of the fixed display area. However, the setting of the distance (display depth) of the display area can be changed to various other settings.

A test and adjustment may be performed in advance. Alternatively, it is also possible to apply a method of performing automatic adjustment when detecting a state in which a line of sight continues to follow a window.

Note that in a case where a depth for displaying the viewpoint-following display area cannot be secured, it is possible to use a different presentation method such as a method of displaying the viewpoint-following display area at a fixed position in a peripheral visual field.

6. Example of Hardware Configuration of Display Apparatus

Next, a configuration example of a hardware configuration of the display apparatus will be described with reference to FIG. 17.

A central processing unit (CPU) 301 functions as a control unit or a data processing unit that performs various types of processing according to programs stored in a read only memory (ROM) 302 or a storage unit 308. For example, the CPU 301 performs processing according to the sequences described in the embodiments above. Programs to be executed by the CPU 301, data, and the like are stored in a random access memory (RAM) 303. The CPU 301, the ROM 302, and the RAM 303 are connected to each other by a bus 304.

The CPU 301 is connected to an input/output interface 305 via the bus 304. The input/output interface 305 is connected to an input unit 306 and an output unit 307. The input unit 306 includes various switches, a keyboard, a mouse, a microphone, a camera, a sensor, and the like. The output unit 307 includes a display, a speaker, and the like. The CPU 301 performs various types of processing in response to commands input from the input unit 306, and outputs processing results to, for example, the output unit 307.

The storage unit 308 connected to the input/output interface 305 includes, for example, a hard disk, and stores the programs to be executed by the CPU 301 and various data. A communication unit 309 functions as a transmission/reception unit for Wi-Fi communication, Bluetooth (registered trademark) (BT) communication, and other data communication via a network such as the Internet or a local area network, and communicates with an external device.

A drive 310 connected to the input/output interface 305 drives a removable medium 311 to perform the recording or reading of data. Examples of the removable medium 311 include a magnetic disk, an optical disk, a magneto-optical disk, and a semiconductor memory such as a memory card.

7. Summary of Configurations of Present Disclosure

The embodiments of the present disclosure have been described above in detail with reference to specific examples. However, it is obvious that those skilled in the art can make modifications and substitutions of the embodiments without departing from the gist of the present disclosure. In other words, the present invention has been disclosed in the form of exemplification, and should not be restrictively interpreted. In order to judge the gist of the present disclosure, the section "CLAIMS" should be taken into consideration.

Note that the technology disclosed in the present specification can adopt the following configurations.

(1) A display apparatus including:

a control unit configured to control movement of a viewpoint-following display area that moves in accordance with movement of a user's point of regard, in which the control unit determines whether to cause the viewpoint-following display area to follow the user's point of regard or to stop the viewpoint-following display area from following the user's point of regard, according to a staying time of the user's point of regard.

(2) The display apparatus according to (1), in which
the display apparatus includes a three-dimensional display apparatus that allows the viewpoint-following display area to be observed in front of a fixed display area.

(3) The display apparatus according to (1) or (2), in which
in a case where the staying time of the user's point of regard reaches or exceeds a specified time t set in advance, the control unit does not cause the viewpoint-following display area to follow the user's point of regard, but fixes the viewpoint-following display area for display.

(4) The display apparatus according to (3), in which
the control unit changes the specified time t according to a process of user input to the display apparatus.

(5) The display apparatus according to (3) or (4), in which
in a case where a process of user input to the display apparatus is detected, the control unit changes the specified time t to a time shorter than a normal setting.

(6) The display apparatus according to any one of (1) to (5), in which
the display apparatus includes a three-dimensional display apparatus configured to display a character string available for input selection in a fixed display area, and to allow the viewpoint-following display area to be observed in front of the fixed display area, the viewpoint-following display area serving as a text box in which an input character string is displayed.

(7) The display apparatus according to any one of (1) to (6), in which
the display apparatus includes an apparatus in which the viewpoint-following display area is set in a display area of a head-up display.

(8) The display apparatus according to (7), in which the viewpoint-following display area is displayed on a windshield of a vehicle.

(9) The display apparatus according to (8), in which
in a case where the staying time of the user's point of regard of a driver of the vehicle reaches or exceeds a specified time t set in advance, the driver looking ahead through the windshield of the vehicle, the control unit does not cause the viewpoint-following display area to follow the user's point of regard, but fixes the viewpoint-following display area for display.

(10) The display apparatus according to (9), in which
the control unit changes the specified time t according to steering information on the driver.

(11) The display apparatus according to (10), in which
in a case where steering by the driver is detected and the viewpoint-following display area is being displayed in a steering direction, the control unit changes the specified time t to a time longer than a normal setting.

(12) The display apparatus according to (10) or (11), in which
in a case where steering by the driver is detected and the viewpoint-following display area is being displayed in a steering direction, the control unit performs a process of changing a display position of the viewpoint-following display area or a process of stopping displaying the viewpoint-following display area.

(13) A display control method to be performed in a display apparatus,
the display apparatus including a control unit configured to control movement of a viewpoint-following display area that moves in accordance with movement of a user's point of regard, the method including:
causing the control unit to determine whether to cause the viewpoint-following display area to follow the user's point of regard or to stop the viewpoint-following display area from following the user's point of regard, according to a staying time of the user's point of regard.

(14) A program for causing a display apparatus to perform display control,
the display apparatus including a control unit configured to control movement of a viewpoint-following display area that moves in accordance with movement of a user's point of regard, the program causing the control unit to perform:
a process of determining whether to cause the viewpoint-following display area to follow the user's point of regard or to stop the viewpoint-following display area from following the user's point of regard, according to a staying time of the user's point of regard.

Furthermore, a series of the processes described in the specification can be implemented by hardware, software, or a configuration in which hardware and software are combined. In a case where the processes are implemented by software, it is possible to execute a program in which a process sequence has been recorded, after installing the program in a memory in a computer incorporated in dedicated hardware or installing the program on a general-purpose computer capable of performing various types of processing. For example, the program can be recorded in advance on a recording medium. In addition to being installed on a computer from the recording medium, the program can be received via a network such as a local area network (LAN) or the Internet and installed on a recording medium such as a built-in hard disk.

Note that the various processes described in the specification may be performed not only on a time-series basis according to the description, but also in parallel or separately depending on the processing capacity of an apparatus that performs the processes or depending on the needs. Furthermore, in the present specification, the term "system" refers to a logical set configuration of a plurality of devices, and is not limited to one in which the devices of each configuration are in the same casing.

INDUSTRIAL APPLICABILITY

As described above, according to the configuration of one embodiment of the present disclosure, a configuration is achieved in which it is possible to easily check information displayed in a viewpoint-following display area as a result of performing control of the movement of the viewpoint-following display area.

Specifically, for example, the control unit, which controls the movement of the viewpoint-following display area that moves in accordance with the movement of the user's point of regard, determines whether to cause the viewpoint-following display area to follow the user's point of regard or to stop the viewpoint-following display area from following the user's point of regard, according to the staying time of the user's point of regard. The display apparatus is configured as a three-dimensional display apparatus or a HUD that allows the viewpoint-following display area to be observed in front of a fixed display area. In a case where the staying time of the user's point of regard reaches or exceeds a specified time t set in advance, the control unit does not cause the viewpoint-following display area to follow the user's point of regard, but fixes the viewpoint-following display area for display. The specified time t is changed according to user input to the display apparatus or the steering of a vehicle.

With the present configuration, a configuration is achieved in which it is possible to easily check information displayed in the viewpoint-following display area as a result of performing control of the movement of the viewpoint-following display area.

REFERENCE SIGNS LIST 11, 12 Data display screen
20 User
21 Controller
30 Display apparatus
31 Fixed display area
32 Viewpoint-following display area
33 Camera
34 Character selection cursor
41 User's point of regard
100 Display apparatus
101 Fixed display area
102 Viewpoint-following display area
103 Camera
104 Character selection cursor
121 User's point of regard
151 Line-of-sight detection unit
152 Point-of-regard three-dimensional position (convergence distance and the like) calculation unit
153 Viewpoint-following display area movement control unit
154 Controller operation information input unit
155 User operation corresponding processing execution unit
156 Viewpoint-following display area information generation unit
157 Fixed display area display information generation unit
158 Display unit
200 Display apparatus
201 Starting point-following display area
211 User's point of regard
251 Line-of-sight detection unit
252 Point-of-regard three-dimensional position (convergence distance and the like) calculation unit
253 Viewpoint-following display area movement control unit
256 Viewpoint-following display area information generation unit
258 Display unit
261 Steering information input unit
301 CPU
302 ROM
303 RAM
304 Bus
305 Input/output interface
306 Input unit
307 Output unit
308 Storage unit
309 Communication unit
310 Drive
311 Removable medium

The invention claimed is:

1. A display apparatus comprising:
   circuitry configured to:
   control movement of a viewpoint-following display area that moves in accordance with movement of a user's point of regard;
   determine whether to cause the viewpoint-following display area to follow the user's point of regard or to stop the viewpoint-following display area from following the user's point of regard, according to a staying time of the user's point of regard; and
   under a condition that the staying time of the user's point of regard reaches or exceeds a specified time t that is set in advance, the circuitry does not cause the viewpoint-following display area to follow the user's point of regard, but fixes the viewpoint-following display area for display and the circuitry changes the specified time t according to a process of user input to the display apparatus.

2. The display apparatus according to claim 1, wherein the display apparatus includes a three-dimensional display apparatus that allows the viewpoint-following display area to be observed in front of a fixed display area.

3. The display apparatus according to claim 1, wherein under a condition that a process of user input to the display apparatus is detected, the circuitry is further configured to change the specified time t to a time shorter than a normal setting.

4. The display apparatus according to claim 1, wherein the display apparatus includes a three-dimensional display apparatus configured to display a character string available for input selection in a fixed display area, and to allow the viewpoint-following display area to be observed in front of the fixed display area, the viewpoint-following display area serving as a text box in which an input character string is displayed.

5. The display apparatus according to claim 1, wherein the display apparatus includes an apparatus in which the viewpoint-following display area is set in a display area of a head-up display.

6. The display apparatus according to claim 5, wherein the viewpoint-following display area is displayed on a windshield of a vehicle.

7. The display apparatus according to claim 6, wherein the user is a driver of the vehicle and the staying time of the user's point of regard reaches or exceeds the specified time t set in advance, the driver looking ahead through the windshield of the vehicle, the circuitry does not cause the viewpoint-following display area to follow the user's point of regard, but fixes the viewpoint-following display area for display on the windshield.

8. The display apparatus according to claim 7, wherein the circuitry changes the specified time t according to steering information on the driver.

9. The display apparatus according to claim 8, wherein under a condition that steering by the driver is detected and the viewpoint-following display area is being displayed in a steering direction, the circuitry changes the specified time t to a time longer than a normal setting.

10. The display apparatus according to claim 8, wherein under a condition that steering by the driver is detected and the viewpoint-following display area is being displayed in a steering direction, the circuitry performs a process of changing a display position of the viewpoint-following display area or a process of stopping displaying the viewpoint-following display area.

11. A display control method to be performed in a display apparatus,
   the display apparatus including circuitry configured to control movement of a viewpoint-following display area that moves in accordance with movement of a user's point of regard, the method comprising:
   causing the circuitry to determine whether to cause the viewpoint-following display area to follow the user's point of regard or to stop the viewpoint-following display area from following the user's point of regard, according to a staying time of the user's point of regard; and under a condition that the staying time of the user's point of regard reaches or exceeds a specified time t that is set in advance, causing the circuitry to stop the viewpoint-following display area from follow the user's point of regard and fixing the viewpoint-following display area for display and causing the circuitry to change the specified time t according to a process of user input to the display apparatus.

12. A non-transitory computer readable storage device comprising a program that when executed by circuitry in a display apparatus configures the circuitry to perform display control, wherein the circuitry is configured by, the program to control movement of a viewpoint-following display area that moves in accordance with movement of a user's point of regard, the program causing the circuitry to further perform:

a process of determining whether to cause the viewpoint-following display area to follow the user's point of regard or to stop the viewpoint-following display area from following the user's point of regard, according to a staying time of the user's point of regard; and under a condition that the staying time of the user's point of regard reaches or exceeds a specified time t that is set in advance, causing the circuitry to stop the viewpoint-following display area from follow the user's point of regard, fix the viewpoint-following display area for display, and change the specified time t according to a process of user input to the display apparatus.

\* \* \* \* \*